(12) United States Patent
Moura et al.

(10) Patent No.: US 11,845,353 B2
(45) Date of Patent: Dec. 19, 2023

(54) METHODS AND SYSTEMS FOR OPTIMAL PRICING AND CHARGING CONTROL OF A PLUG-IN ELECTRIC VEHICLE CHARGING STATION

(71) Applicants: TOTAL SE, Courbevoie (FR); The Regents of the University of California, Oakland, CA (US)

(72) Inventors: Scott Moura, Berkeley, CA (US); Teng Zeng, Berkeley, CA (US); Sangjae Bae, Berkeley, CA (US); Wente Zeng, San Francisco, CA (US); Carl Lenox, San Rafael, CA (US); Bertrand Travacca, Oakland, CA (US)

(73) Assignees: TOTAL SE, Courbevoie (FR); The Regents of the University of California, Oakland, CA (US)

( * ) Notice: Subject to any disclaimer, the term of this patent is extended or adjusted under 35 U.S.C. 154(b) by 561 days.

(21) Appl. No.: 17/112,646

(22) Filed: Dec. 4, 2020

(65) Prior Publication Data

US 2022/0176841 A1    Jun. 9, 2022

(51) Int. Cl.
*B60L 53/64*  (2019.01)
*B60L 53/67*  (2019.01)
(Continued)

(52) U.S. Cl.
CPC .............. *B60L 53/64* (2019.02); *B60L 53/665* (2019.02); *B60L 53/67* (2019.02); *B60L 53/68* (2019.02)

(58) Field of Classification Search
CPC .......... B60L 53/00; B60L 53/10; B60L 53/60; B60L 53/62; B60L 53/63; B60L 53/64;
(Continued)

(56) References Cited

U.S. PATENT DOCUMENTS 10,981,464 B1 *  4/2021  Sun ........................ B60L 53/62
11,413,984 B2 *  8/2022  Yang ...................... B60L 58/12
(Continued)

OTHER PUBLICATIONS

Teng Zeng, et al., "Solving Overstay in PEV Charging Station Planning via Chance Constrained Optimization", Computer Science, Mathematics • ARXIV: Optimization and Control, arXiv:1901.07110v1, 2019, 5 pages.
(Continued)

*Primary Examiner* — Russell Frejd
*Assistant Examiner* — Sara J Lewandroski
(74) *Attorney, Agent, or Firm* — Oblon, McClelland, Maier & Neustadt, L.L.P.

(57) ABSTRACT

Systems and methods for including overstay and human behavior in the pricing structure of a plug-in electric vehicle (PEV) charging station, in order to maximize operating revenue, and manage overstay duration. A mathematical framework with discrete choice models (DCM) is incorporated to operate a PEV charging station with an optimal pricing policy and charge control. The framework determines the probability of a PEV driver selecting various charging options, including overstay price. The pricing options are charging-flexibility, which allows a controller to manage charging costs over a parking duration, charging-asap, which charges the electric vehicle immediately and continuously until the vehicle departs, the battery is fully charged, or a desired level of charge has been reached, and leaving, which is an opportunity cost to the charging station.

20 Claims, 10 Drawing Sheets

(51) Int. Cl.
*B60L 53/66* (2019.01)
*B60L 53/68* (2019.01)

(58) Field of Classification Search
CPC ........ B60L 53/65; B60L 53/66; B60L 53/665; B60L 53/67; B60L 53/68; B60L 53/80
See application file for complete search history.

(56) References Cited

U.S. PATENT DOCUMENTS

| | | | | |
|---|---|---|---|---|
| 2009/0313034 | A1* | 12/2009 | Ferro | B60L 53/68 705/1.1 |
| 2011/0191220 | A1* | 8/2011 | Kidston | B60L 3/04 705/412 |
| 2012/0013301 | A1* | 1/2012 | Gaul | B60L 3/12 320/109 |
| 2018/0012197 | A1* | 1/2018 | Ricci | G06F 21/31 |
| 2018/0111494 | A1* | 4/2018 | Penilla | G06Q 20/145 |
| 2020/0101863 | A1* | 4/2020 | Westin | B60L 53/68 |
| 2021/0213846 | A1* | 7/2021 | Sun | B60L 58/12 |
| 2022/0144122 | A1* | 5/2022 | Grunkemeyer | B60L 53/64 |
| 2022/0188946 | A1* | 6/2022 | Moura | G06Q 30/0283 |
| 2022/0194255 | A1* | 6/2022 | Hartnagel | G06Q 50/06 |
| 2023/0067233 | A1* | 3/2023 | Noh | B60L 53/12 |

OTHER PUBLICATIONS

Yangyang Xu, et al., "A Block Coordinate Descent Method for Regularized Multiconvex Optimization with Applications to Nonnegative Tensor Factorization and Completion", Siam Journal on Imaging Sciences, vol. 6, No. 3, 2013, pp. 1758-1789.

"All Roads Lead to e-Mobility: Insights from 10 Years of Electric Vehicle Charging Data", Chargepoint, Charging Forward Report, https://info.chargepoint.com, 2017, 41 pages.

Liu Yuanyuan, "China Strives to Speed up Development of EV Charging Stations", https://www.renewableenergyworld.com/articles/2018/06/china-strives-to-speed-up-development-of-ev-charging-stations.html, Jun. 1, 2018, 6 pages.

"Electric Vehicle Charging Station Locations", U.S. Department of Energy—Energy Efficiency and Renewable Energy; Alternative Fuels Data Center, https://afdc.energy.gov/fuels/electricity_locations.html, 2018, 2 pages.

Arpita Biswas, et al., "Managing Overstaying Electric Vehicles in Park-and-Charge Facilities", Proceedings of the Twenty-Fifth International Joint Conference on Artificial Intelligence (IJCAI-16), 2016, pp. 2465-2471.

Fred Lambert, "Tesla increases Supercharger idle fees to decrease wait times", ELECTREK, https://electrek.co/2018/09/19/tesla-update-supercharger-idle-fees/, Sep. 19, 2018, 6 pages.

Alex Pentland, et al., "Modeling and Prediction of Human Behavior", Neural Computation, vol. 11, No. 1, 1999, pp. 229-242.

Ludwig Arnold, "Random Dynamical Systems", Springer Monographs in Mathematics, 1998, 4 pages (Abstract only).

Subhas Chandra Mukhopadhyay, "Wearable Sensors for Human Activity Monitoring: A Review", IEEE Sensors Journal, vol. 15, No. 3, Mar. 2015, pp. 1321-1330.

Sangjae Bae, et al., "System Analysis and Optimization of Human-Actuated Dynamical Systems", IEEE 2018 Annual American Control Conference (ACC), Jun. 27-29, 2018, 7 pages.

Sangjae Bae, et al., "Modeling & Control of Human Actuated Systems," Ifac-Papersonline, vol. 51, Issue 34, 2019, pp. 40-46.

Eilyan Bitar, et al., "Deadline Differentiated Pricing of Deferrable Electric Loads", IEEE Transactions on Smart Grid, vol. 8, Issue 1, Aug. 24, 2016, pp. 13-25.

Kenneth Train, "Qualitative Choice Analysis: Theory, Econometrics, and an Application to Automobile Demand", MIT Press, vol. 10, 1986, 3 pages (Abstract only).

Stephen Boyd, et al., "Convex Optimization", Cambridge University Press, 2004, 715 pages.

* cited by examiner

METHODS AND SYSTEMS FOR OPTIMAL PRICING AND CHARGING CONTROL OF A PLUG-IN ELECTRIC VEHICLE CHARGING STATION

BACKGROUND

Field of the Invention

Methods and systems are provided to manage overstay at a plug-in electric vehicle (PEV) charger at a charging station by incorporating overstay and human behavior into a pricing policy.

Description of the Related Art

Forecasts project that the number of plug-in electric vehicles (PEV) will reach 1 million in the U.S. market by 2021, and that more than 50% of new cars sold globally by 2040 will be electric vehicles. However, the continued growth of PEVs may be impeded by limited accessibility to charging infrastructure. Although governments and private companies have put forth great efforts to deploy public charging systems, there remains a large gap between the current service capability and the expected PEV deployment. That is, PEV penetration has out-paced charging station deployment. In urban areas, especially central business districts, the competition for charging resources is high. After a charger is plugged into a vehicle, the charger will remain occupied and unavailable to others (even if the PEV is not charging) until the driver returns from work, shopping, dining, etc. This behavior is called "overstay". Today, "overstay" can occupy a charger for 6-8 hours in a typical day, preventing availability of the charger to provide the charging service to other vehicles. In response to this overstay problem, the charging service providers often (i) install more chargers to satisfy demand, (ii) hire a human valet to rotate vehicles, and/or (iii) apply a monetary penalty if drivers overstay.

"Human-in-the-loop" dynamics occur between the human customers, i.e., the PEV drivers, and the station operator. Essentially, to charge a vehicle, human drivers are exposed to prices for electricity, parking, overstaying, etc. The driver decides on a charging service accordingly, based on the desired energy to be delivered, and on the desired parking/overstay duration.

Incorporating human behavior into system operations is known in the domain of Cyber-Physical & Human Systems (CPHS). In CPHS, human inputs can be a crucial component, but play different roles in different contexts. Examples include humans as disturbances, humans as co-operators, or humans as system actuators. Human behavior control systems, in which the desired human behavior can be induced by a quantitative incentive that the system operator can control are referred to as "human actuated systems".

A deadline-differentiated pricing scheme was previously tried to present customers with options for managing deferrable loads. A quantitative incentive is given by a lower electricity price when customers have later departure times, and hence endow more charging flexibility to the station operator. However, this pricing scheme effectively induced customers to occupy chargers for longer times than necessary to complete the desired charging and thus exacerbated the overstay problem.

The overstay issue at charging stations has not been fully resolved, despite its significant impact in the costs of charging. Given the limited number of chargers at a given charging station, one possible way to improve accessibility is to reduce overstay duration. The general approach is to introduce a monetary penalty on overstaying PEVs. Other options have been proposed. For example, an "interchange" operation was proposed, which actively unplugs fully charged PEVs, associates the action of unplugging with a financial burden, and essentially serves as a penalty to users. Another publication introduced a penalty function, which is activated once the actual charging session is finished, if the PEV remains occupying the charger. A penalty acceptance probability was also developed to further determine the appropriate price setting for the penalty function.

Recently, an electric car manufacturer implemented a similar approach to address the overstay problem. An "idle fee" was imposed, which is a monetary penalty cost to users, measured in dollars per minute after the PEV charging completed but the PEV remained connected to the charger. However, the effectiveness of such a penalty has not been determined.

PEV drivers are each individual decision makers who should be studied to understand their sensitivity to various pricing options. Once human decision-making regarding charging and overstay penalties is better understood, station operators may optimally price charging service options to maximize profit yet ensure high station throughput.

Accordingly, it is an object of the present disclosure to describe a charging station pricing structure for an individual charger at the charging station that incorporates overstay, vehicle charging choices, and human behavior.

SUMMARY

In an exemplary embodiment, a system is described for determining a pricing policy for charging electric vehicles, the pricing policy including overstay, comprising a charging terminal configured for delivering a charging power to a battery of an electric vehicle; and a computing device including a charging system controller and a pricing policy processor, the charging system controller being configured to receive user inputs from a user computing device, the user inputs including an expected parking duration and a desired added range, send the user inputs to the pricing policy processor; and the pricing policy processor being configured to receive the user inputs from the charging system controller, generate pricing options based on the expected parking duration, the desired added range and at least one parameter among the following parameters: a time of day, a current energy cost, a future energy cost and a probability of the user choosing a pricing option or choosing to reject all pricing options and leaving, optimize the pricing options for maximum net profit and/or maximum electric vehicle throughput of the at least one charging terminal; transmit the pricing options to the user computing device, wherein the pricing options include a price for charging-asap, a price for charging-flexibility and a price for overstay; receive a user pricing choice and generate and transmit an optimized charging schedule to the charging terminal to control the charging power over the expected duration.

In another exemplary embodiment, a method is described for determining a pricing policy for charging electric vehicles, the pricing policy including overstay, comprising: receiving, at a charging system controller, user inputs including an expected parking duration and a desired added range; sending the user inputs to a pricing policy processor; receiving, by the pricing policy processor, the user inputs; generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving; optimizing the pricing options for maximum net profit and/or maximum electric vehicle throughput of the charging terminal; transmitting the pricing options to a user, wherein the pricing options include a price for charging-asap, a price for charging-flexibility, and a price for overstay; and receiving a user pricing choice and generating and transmitting an optimized charging schedule to the charging terminal to control the charging power over the expected duration.

In another exemplary embodiment, a non-transitory computer readable medium having instructions stored therein that, when executed by one or more processors, cause the one or more processors to perform a method determining a pricing policy for charging electric vehicles, the pricing policy including overstay is described, comprising: receiving, at a charging system controller, user inputs including an expected parking duration and a desired added range; sending the user inputs to a pricing policy processor; receiving, by the pricing policy processor, the user inputs; generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving; optimizing the pricing options for maximum net profit and/or maximum electric vehicle throughput of the charging terminal; transmitting the pricing options to a user, wherein the pricing options include a price for charging-asap, a price for charging-flexibility, and a price for overstay; and receiving a user pricing choice and generating and transmitting an optimized charging schedule to the charging terminal to control the charging power over the expected duration.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A shows mean overstay duration per hour, FIG. 5B shows net profit per day, and FIG. 5C shows the probability of the number of services provided.

DETAILED DESCRIPTION

Figure 1A:
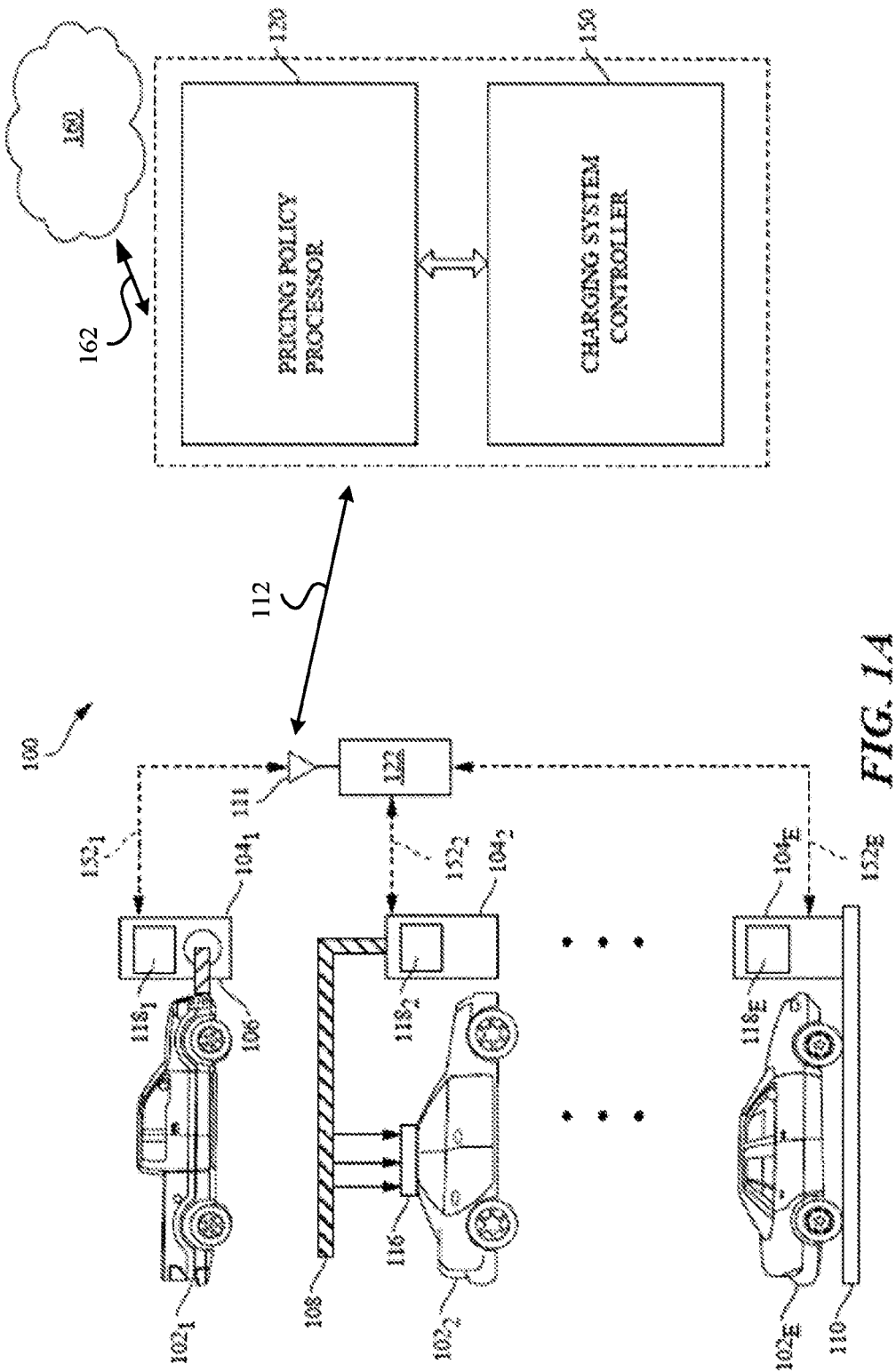
FIG. 1A is an overview of an exemplary charging system for addressing the overstay problem, according to a described embodiment.

Referring now to the drawings, wherein like reference numerals designate identical or corresponding parts throughout the several views.

Aspects of the present disclosure describe systems and methods for incorporating overstay into the pricing structure of an individual charger at a PEV charging station, maximizing profit and/or maximizing throughput.

As used herein, "overstay" refers to a portion of time during which an electric vehicle occupies a charging terminal after the electrical power has been delivered. Overstay prevents another electric vehicle from using the charging terminal and is thus may represent a loss of profit to a charging station. As such, the price of electric power transfer includes overstay and a charging system controller includes projections of this loss of profit in the calculation of its pricing policies.

A mathematical framework with a discrete choice model (DCM) is described to operate a PEV charging station with an optimal pricing policy including overstay. The framework incorporates a PEV driver's probability of selecting various charging options, and incorporates overstay, both of which are responsive to the pricing policy.

In the present disclosure, human behavior models are incorporated in order to address the EV charging station overstay issue. Aspects of the present disclosure describe a mathematical framework to optimally operate a charging station to maximize operating revenue, and manage overstay duration. This optimized operation strategy may help station operators realize maximum facility utilization and customer satisfaction. An exact reformulation is described which turns this non-convex optimization problem into a multi-convex problem. The problem is then solved through a Block Coordinate Descent (BCD) algorithm, which provides convergence guarantees for real-time operation.

In the present disclosure, overstay has been addressed in which a longer stay does not mean higher costs or loss of profit for the charging station. A formalized mathematical framework is described to incorporate a human behavior model for a discrete set of choices, i.e., a DCM. The framework has formerly been cast as a classical nonlinear optimal control problem, solved via dynamic programming (DP) or sequential quadratic programming (SQP). However, scalability and/or approximation errors (in SQP) remain, hindering these classical numerical optimal control methods. In the present disclosure, the non-convex optimal control problem is reformulated into a multi-convex optimization problem, and applied to PEV charging station operations.

In the present disclosure, the "human-in-the-loop" dynamics that occur between the human customers, i.e. the PEV drivers, and the station operator, are acknowledged.

The overstay duration is defined as the time duration after the energy addition requested for the charging session is complete or the PEV is fully charged, but continues to occupy a charger. In the present disclosure, a monetary penalty is imposed on PEVs that overstay. However, overstay is evaluated differently in two charging options, which are defined as charging-flexibility and charging-asap, respectively. In this arrangement, a driver inputs the desired parking duration upon arrival to the charger. If the user chooses charging-flexibility, then the overstay fee is not charged during the reserved parking duration, but is charged after the reserved parking duration period ends if the user does not exit the charging terminal. However, if the user chooses charging-asap, the overstay fee is charged immediately after the PEV is fully charged, irrespective of the parking duration declared by the driver upon arrival. From a station operator's perspective, incentivizing long-duration customers for flexible charging draws economic benefits by scheduling energy delivery to avoid high price periods, yet may decrease the number of customers that can be served.

FIG. 1A shows an overview of an exemplary PEV charging station 100. Charging terminals 104$i$ (i=1 . . . E), where E equals the number of charging terminals at the PEV charging station, are shown with vehicles 102$_i$(i=1 . . . E) docked into charging terminals 104$i$. Each charging terminal 104$_i$ may be equipped for charging by connecting a charging cable of the vehicle to a plug 106, as shown for vehicle 102$_1$ plugged into charging terminal 104$_1$.

Alternatively, a charging terminal 104$_2$ may be equipped to provide contactless charging, as shown for vehicle 102$_2$, in which wireless electromagnetic radiation from overhead power lines 108 directly charges an inductive charger 116 on or in the roof of the vehicle 102$_2$. Power line 108 may alternatively be located under or next to the vehicle 102$_2$.

In another alternative, a charging terminal 104$_E$ may be equipped to provide inductive charging 110, as shown for vehicle 102$_E$, in which electromagnetic radiation is used to wirelessly charge a coil (not shown) in, e.g., the undercarriage of the vehicle. Inductive charging 110 may alternatively be located above or next to the vehicle 102$_E$. However, the charging terminal is not limited to a specific type of physical or inductive coupling to an electric vehicle, and may be any kind of physical/wireless connection that charges an electric vehicle battery.

As shown in FIG. 1A, each charging terminal 104$_i$ may have a display screen 118$_i$, which can show information, such as charging time, ON, OFF, or the like, to a driver of a vehicle. The driver may interact with the charging system controller 150 through a downloadable mobile web application or by accessing a website through his/her user device, e.g., a smartphone, tablet, personal computer connected to a hotspot, or the like. The charging system controller 150 and pricing policy processor 120 may be embodied as virtual resources in a "cloud". Cloud computing infrastructure is the collection of hardware and software elements needed to enable cloud computing. It includes computing power, networking, and storage, as well as an interface for users to access their virtualized resources. The virtual resources mirror a physical infrastructure, with components like servers, network switches, memory and storage clusters.

Each charging terminal 104$_i$ may be connected (shown as communication lines 152$_1$, 152$_2$, . . . , 152$_E$) to cloud computing infrastructure including a charging system controller 150, through an access point 122 or other communication system (not shown). The access point 122 may have an antenna 111 which bidirectionally communicates with charging system controller 150 over communication channel 112. The antenna 111 may be a plurality of antennas, each configured for a different type of communication, such as WIFI®, BLUETOOTH®, or the like. For example, the antenna 111 may communicate by near field communications, such as BLUETOOTH® or WIFI®, with a charging terminal 102$_i$, but may communicate with the cloud server through an internet protocol suite, such as TCP/IP. Alternatively, each charging terminal may include a communication device and communicate directly to the charging system controller 150 over the internet.

Each charging terminal 104$_i$ may include a computer including circuitry, an antenna, and memory (not shown) configured to receive a power schedule from a charging system controller 150 through the access point 122 or through its communication system and use the power schedule to deliver power to a battery of a vehicle (102$_1$, 102$_2$, . . . , 102$_E$). The charging system controller 150 includes electrical circuitry and a non-transitory computer readable medium having instructions stored therein which are executed by one or more processors. The charging system controller 150 includes a pricing policy processor 120 and computer instructions for calculating a pricing policy and a charging schedule for delivering charging power to a vehicle.

The charging system controller 150 may be further configured to communicate with a data center 160 to access higher level processing programs, historical charging records, energy supplier current service rates, energy incentives, or the like. Pricing policy processor 120 is in bidirectional communication with the charging system controller 150. The charging system controller 150 may interact with the datacenter 160 through a wireless network 162.

In an alternative aspect of the present disclosure, each charging terminal may include a charging system controller and pricing policy processor and operate as a stand-alone device.

The charging terminal 104$_i$ may include computing circuitry and a memory (not shown). The computing circuitry may be implemented as one or more microprocessors, microcomputers, microcontrollers, digital signal processors, central processing units, graphical processing units, state machines, logic circuitries, and/or any devices that manipulate signals based on operational instructions. Among other capabilities, the computing circuitry may be configured to fetch and execute computer-readable instructions stored in the memory. In an aspect of the present disclosure, the memory may include any computer-readable medium known in the art including, for example, volatile memory, such as static random access memory (SRAM) and dynamic random access memory (DRAM) and/or nonvolatile memory, such as read-only memory (ROM), erasable programmable ROM, flash memory, hard disks, optical disks, and magnetic tapes. The memory may be capable of storing data and allowing any storage location to be directly accessed by the computing circuitry.

The charging system controller 150 and pricing policy processor 120 may be instructions operating on a virtual machine accessed in a cloud computing environment, such as an application server. For example, the cloud computing infrastructure can include processing circuitry configured to operate the system 100, receive data from the personal computing device of a driver, receive statistical information from the database 160, a subscriber database 154, and the like. The server may share computing resources, such as CPU and random-access memory over a network. The cloud network enables the user to communicate with the charging system controller through a downloaded mobile web application or through accessing a website with his/her personal computing device.

Figure 1B:
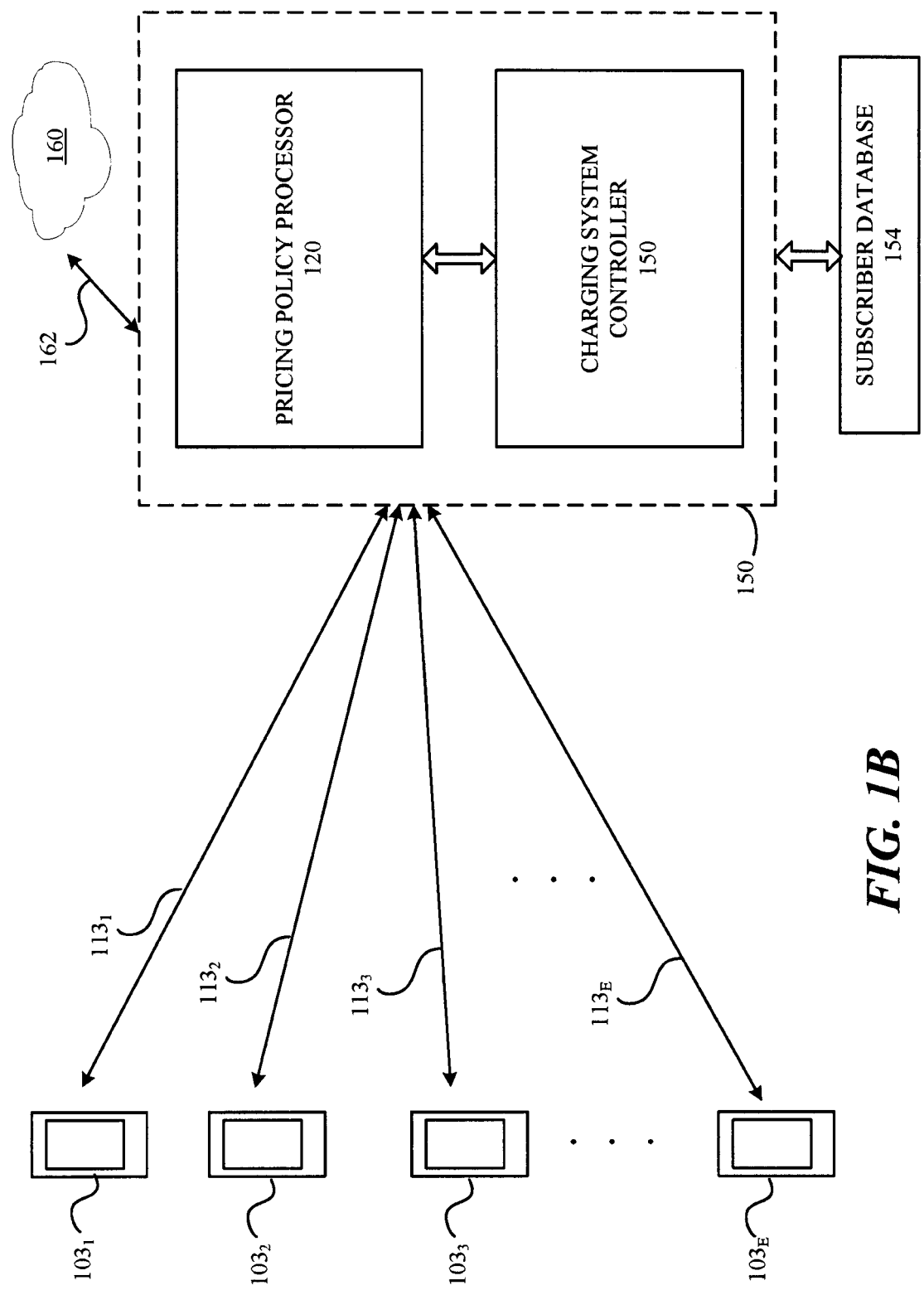
FIG. 1B is an overview of user communication with the charging system, according to a described embodiment.

As shown in FIG. 1B, each driver uses a personal computing device ($103_1$, $103_2$, $103_3$, ..., $103_E$), e.g., a smartphone, a tablet, a personal computer connected to a hotspot, or the like, to interact with the controller 150 through a computer application or through a website. The personal computing device may have downloaded and registered with a computer application configured to access the pricing policy for the charging system. Alternatively, the personal computing device may have registered with a website configured to compute the pricing policy. The personal computing device may interact with the charging system controller 150 over the public internet through communication paths ($113_1$, $113_2$, $113_3$, ..., $113_E$).

When the personal computing device registers with the computer application or with the website, data such as vehicle make, vehicle model, vehicle manufacturing year, current mileage, type of charging port may be required from the driver, as well as payment information. The charging system controller may access user information and information about the vehicle from the subscriber database 154. The user information may include payment information and identification information.

When the user accesses the computer application or website, the user inputs an intended parking duration and a desired added range. The added range may be in units of miles or kilometers.

The charging system controller 150 sends the user inputs to the pricing policy processor 120. The charging system controller also accesses vehicle information, such as battery capacity, maximum charging power, vehicle make and model, from the subscriber database 154. The charging system controller 150 may include a non-transitory computer readable medium having instructions stored therein that, when executed by the pricing policy controller 120, cause the pricing policy controller to generate pricing choices for the user, where the pricing choices include charging-asap and charging flexibility. The pricing policy controller may include overstay in the pricing options.

The pricing policy processor 120 receives the user inputs and vehicle data, accesses utility tariffs from memory or from database 160 and determines optimized pricing for the vehicle based on the user inputs and vehicle data. The optimized pricing includes options for immediate charging (charging-asap) and longer term charging where the charging system controller can manage the charging schedule and power transfer (flexible charging). The charging system controller 150 is thus configured to manage the charging of each vehicle in order to optimize profitability and/or throughput of the charging terminal.

Figure 2:
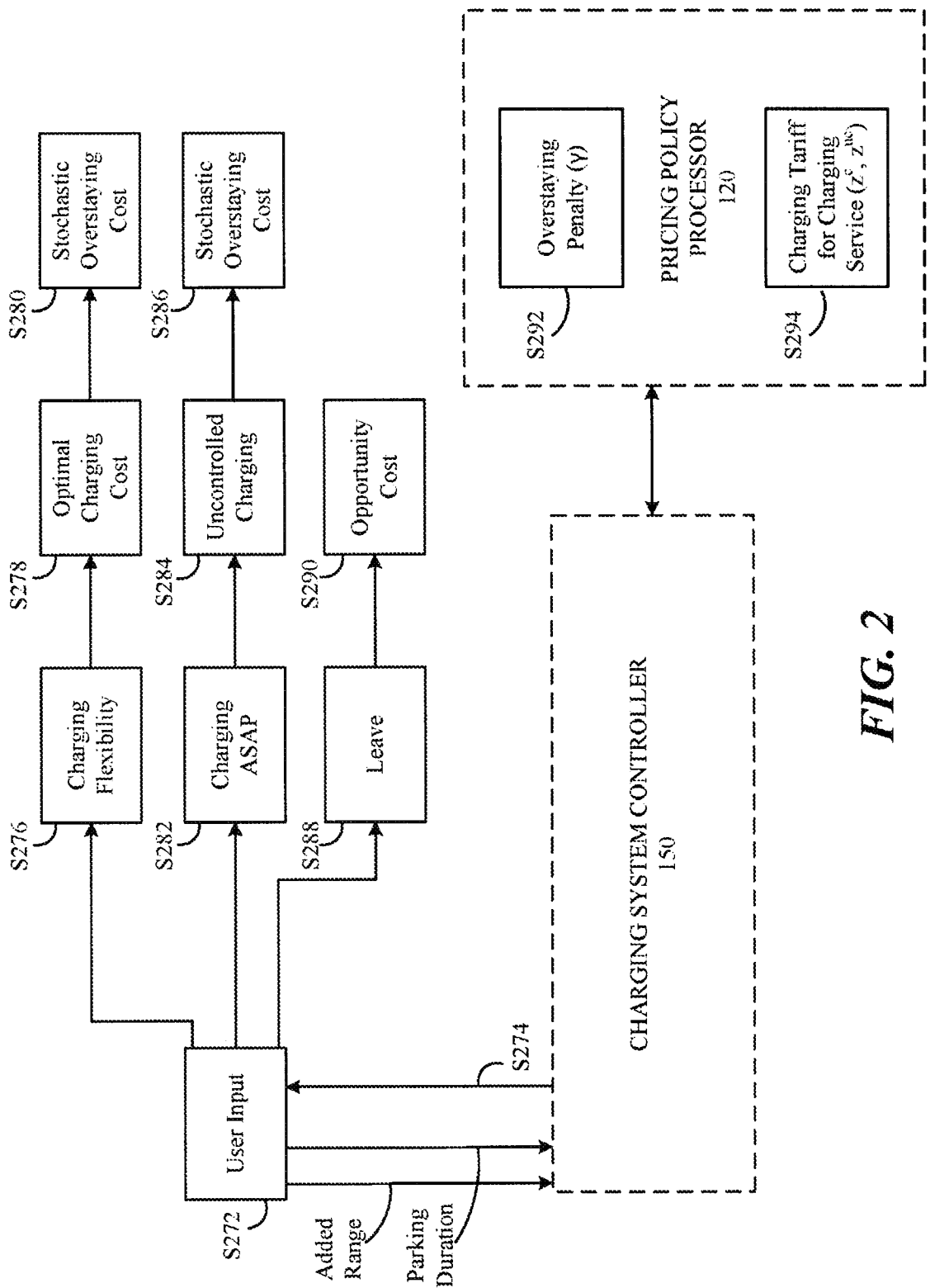
FIG. 2 is a flow chart illustrating a PEV charging station decision process when a PEV is connected, according to a described embodiment.

FIG. 2 illustrates the charger operation for a single PEV driver (denoted as "user"). Upon arrival to the PEV charging station, the user inputs (S272) the following information: intended parking duration and desired added range in miles or kilometers. In sequence, the user receives the pricing for two charging service options (S294) in [$/kWh], and an overstay price (S292) in [$/hour] from the charging system controller 150 (see arrow 274). These prices are computed by the pricing policy processor 120. Given the price options, the user chooses one of the following three options:

(i) Charging-flexibility (S276): As used herein, charging-flexibility refers to controlled charging with flexibility granted by customer, for which the requested energy is guaranteed to be delivered by the scheduled departure time. The charging cost (S278) may be optimized by the charging system controller 150. This option benefits a user who will leave the vehicle at the charging station for a longer period of time, for example, while working. This option also benefits the charging station, in that it can manage and distribute the power draw necessary to service a $102_i$ requesting charge at the charging terminals $104_i$. For example, when the energy cost during one time period is higher than another time period, the controller may manage the cost to the charging station of the energy delivered such that it defers power delivery to the PEV battery until the cost of energy falls. For example, peak power or energy drawn from a utility grid over a maximum amount may be priced by the utility at a higher rate, thus increasing energy costs to the charging station. Additionally, if the charging station is able to manage its energy costs by sourcing from lower cost, but limited, renewable energy sources, the charging station can offer the driver a lower price for the charge. However, if all charging terminals are occupied by vehicles, this option may also result in profit loss to the charging station. A stochastic overstaying cost (S280) is assessed if the user does not remove the vehicle from the charging terminal $104_i$ within the time period specified.

(ii) Charging-asap (S282): As used herein, charging-asap refers to uncontrolled charging (S284). The PEV is charged at maximum available power continuously, starting immediately, until the vehicle departs, the battery is fully charged, or until a requested level of charge has been delivered. The charging cost is the current cost of the available power. For example, a driver might only need to drive an additional 20 miles to reach a destination, where there is a dedicated charging port to deliver lower cost electricity, e.g., overnight.

If the vehicle remains at the charging terminal $104_i$ longer than necessary to receive the requested charging, a stochastic overstaying cost (S286) is assessed.

iii. Leave (S288): As used herein, leave refers to the choice of the driver leaving the station without charging. In this situation, the opportunity for the charging station to realize profit is lost, so the opportunity cost (S290) to the charging station is included in the profit optimization.

If a charger is vacant and a user decides to accept one of the charging services (e.g., charging-flexibility or charging-asap), the charger will be occupied for the entire parking duration. When the user departs, the user pays the service fee (including overstay fees if applicable). The charger then becomes available to others. If the user decides to leave without charging (e.g., leave), the charger remains open to others. In this situation, there is no charge to the user. However, there is a loss of income to the charging station due to the amount of time before another vehicle accesses the charging terminal. To clarify, "Leave" means that the user chooses not to initiate a charging session at all, and physically leaves the parking space.

Behavioral Modeling with Discrete Choice Model (DCM)

In the system, each choice alternative is associated with a corresponding operation cost. Evaluating which alternative the user would choose (i.e., human behavior) is a key problem when determining the pricing policy. To mathematically evaluate those behaviors, a DCM is applied, and more specifically, a multinomial logit model.

In statistics, multinomial logistic (logit) regression is a classification method that generalizes logistic regression to multiclass problems, i.e., with more than two possible discrete outcomes. It is a model used to predict the probabilities of the different possible outcomes of a categorically distributed dependent variable, given a set of independent variables (which may be real-valued, binary-valued, categorical-valued, etc.). Multinomial logistic regression is used when the dependent variable in question is nominal (equivalently categorical, meaning that it falls into any one of a set of categories that cannot be ordered in any meaningful way) and for which there are more than two categories. The multinomial logistic model assumes that data are case specific, i.e., each independent variable has a single value for each case. The multinomial logistic model also assumes that the dependent variable cannot be perfectly predicted from the independent variables for any case. As with other types of regression, there is no need for the independent variables to be statistically independent from each other. However, collinearity is assumed to be relatively low, as it becomes difficult to differentiate between the impact of several variables if this is not the case.

In DCM, each alternative has a specific utility function, and an alternative is chosen when its perceived utility is higher than that of others. Mathematically, for the m-th alternative, $m \in \{1, 2, \ldots, M\}$, the utility function, U, is $$U_m \triangleq \beta_m^T z_m + \gamma_m^T w_m + \beta_{0m} + \epsilon_m, \quad (1)$$

where z is a set of "incentive" controls, w is a set of exogenous variables (or disturbances), $\beta_m$ and $\gamma_m$ are weights for the controllable inputs and uncontrollable inputs, respectively, $\beta_{0m}$ is a so-called "alternative specific constant", "T" indicates the transpose, and $\epsilon_m$ accounts for a latent variable for unspecified errors. In the context of PEV charging station operation, "incentive" controls include charging price and overstay price, and exogenous variables include time-of-the-day, parking duration, battery capacity, initial SOC, and needed SOC (requested by user in the form of range added, in units of distance).

Based on the multinomial logit model, the probability of choosing alternative m is $$Pr(\text{alternative } m \text{ is chosen}) = \frac{e^{V_m}}{\sum_{n=1}^{M} e^{V_m}}, \quad (2)$$

where $V_m \triangleq \beta_m^T z_m + \gamma_m^T W_m + \beta_{0m}$. The probability of choosing each alternative is a sigmoid (or softmax) function, which is not convex in z. This non-convex function is reformulated into a multi-convex optimization problem.

The assumption is made that same behavioral model is applied to all users. These users undergo the same decision process presented in FIG. 2 when selecting charging options, given prices. This can be relaxed by clustering users into groups. An additional assumption is made that each user faithfully chooses only one alternative at a time among the three alternatives, and that the users are rational in that they try to selfishly maximize their individual utilities. Those assumptions are reasonable at the PEV charging station, since it is impossible for the users to choose two charging options at the same time and they prefer the alternative that benefit themselves the most. Furthermore, there is an assumption that the DCM parameters are known, i.e., the control system has a sufficient amount of data from historical observation decisions of users, given different incentives, to identify an accurate DCM. Finally, the assumption is made that the demographic information of each user is not known, i.e., only measurable data is used as features in the DCM.

The detailed mathematical formulations for the pricing policy processor are described below. The control problem is solved each time a user arrives to the charging station and requests a charging service.

The objective of the pricing policy processor is to minimize a convex combination of: (i) the net charging expenses for purchasing electricity power from the grid, and (ii) the net cost associated with overstay. Three control variables for the pricing policy are considered: (i) a charging tariff for charging-flexibility $z^{flex}$, (ii) a charging tariff for charging-asap $z^{asap}$, and (iii) an overstay pricey.

In order to formulate the objective function, there are three possible alternatives that each user can choose: (i) charging-flexibility (S276); (ii) charging-asap (S282); or (iii) leave (S288), as shown in FIG. 2. For the first two choices, i.e., the user decides to charge, the total cost is a deterministic cost resulting from provisioning an electricity charging service, and a random cost resulting from overstay. For the third choice, a deterministic opportunity cost resulting from losing a customer is considered. The probability of choosing each alternative is governed by the DCM, which is written as a function of the control variables $z=[z^{flex} \; z^{asap} \; y \; 1]^T$. The objective function, J, is the expected cost over the total parking duration, formulated as $$J = Pr(\text{charging-flex})(f_{flex}(z) + \lambda_g g_{flex}(z)) \quad (3)$$

$$+ Pr(\text{charging-asap})(f_{asap}(z) + \lambda_g g_{flex}(z)) \quad (4)$$

$$+ Pr(\text{leave})(f_l(z)) \quad (5)$$

where Pr indicates the probability of choosing a charging option, $f$ indicates a deterministic cost, g indicates a random cost, and $\lambda_g$ is a regularization parameter. The functions $f$, g are formulated for each alternative below.

When the user selects the charging-flexibility option, the system operator receives added flexibility for shaping the electricity demand of the charging station during a designated parking duration $\Delta kN$. The charging system controller 150 can optimally schedule a charging profile which minimizes the cost to the charging station. For the optimal charging control, the following state-of-charge (SOC) dynamics are considered:

$$SOC_{k+1} = SOC_k + \frac{\Delta k - \eta u_k}{B}, \quad (6)$$

for time step $k \in [0, N-1]$ where u is the charging power level, $\Delta k$ is a time step size, $\Delta kN$ is the parking duration, $\eta \in [0, 1]$ is the charger's efficiency, and B is the battery capacity.

$f_{flex}$ is the optimal cost of charging control, formulated as $$f_{flex}(z) = \min_{u, SOC} \sum_{k=0}^{N-1} u_k(c_k - z) + \lambda_u \|u\|^2, \quad (7)$$

$$\text{subject to } SOC_0 = SOC_{init} \quad (8)$$

$$SOC_{k+1} = SOC_k + \frac{\Delta k \eta u_k}{B}, \; \forall k \in [0, N-1], \quad (9)$$

$$SOC_N \geq SOC_{need} \quad (10)$$

where $c_k$ is the time-of-use electric utility price at time k, and $\lambda_u$ is the regularization parameter for the charging power u. The equality constraints are written in matrix form Cx=d, where:

$$C = \begin{bmatrix} 1 & 0 & \cdots & 0 & 0 & 0 & \cdots & 0 \\ -1 & 1 & \cdots & 0 & 0 & -\frac{\Delta k \eta}{B} & \cdots & 0 \\ \vdots & \vdots & & \vdots & \vdots & \vdots & & \vdots \\ 0 & 0 & \cdots & -1 & 1 & 0 & \cdots & -\frac{\Delta k \eta}{B} \end{bmatrix}$$

$$d = [SOC_{init} \ 0 \ \cdots \ 0]^T$$

$$x = [SOC_0 \ \cdots \ SOC_N \ u_0 \ \cdots \ u_{N-1}]^T$$

The inequality constraint (Eqn. (10)) is also written as a matrix form $Ax \leq b$, where $$A = \begin{bmatrix} 1 & \cdots & 0 & 0 & 0 & \cdots & 0 \\ \vdots & & \vdots & \vdots & \vdots & & \vdots \\ 0 & \cdots & 1 & 0 & 0 & \cdots & 0 \\ 0 & \cdots & 0 & -1 & 0 & \cdots & 0 \\ 0 & \cdots & 0 & 0 & 1 & \cdots & 0 \\ \vdots & & \vdots & \vdots & \vdots & & \vdots \\ 0 & \cdots & 0 & 0 & 0 & \cdots & 1 \\ 0 & \cdots & 0 & 0 & -1 & \cdots & 0 \\ \vdots & & \vdots & \vdots & & & \vdots \\ 0 & \cdots & 0 & 0 & 0 & \cdots & -1 \end{bmatrix}$$

$$b = \begin{bmatrix} 1 \\ \vdots \\ 1 \\ -SOC_{need} \\ p_{max} \\ \vdots \\ p_{max} \\ -p_{min} \\ \vdots \\ -p_{min} \end{bmatrix}$$

with the dimensions $A \in \mathbb{R}^{((N+1)+N+N) \times ((N+1)+N)}$ and $B \in \mathbb{R}^{(N+1)+N+N}$. Then, the optimization can be written as:

$$f_{flex}(z) = \min_x \sum_{k=0}^{N-1} [x]_{N+2+k}(c_k - z^c) + \lambda_u [x]^2_{N+2+k} \quad (11)$$

subject to $Ax \leq b$ and $Cx = d$.

The random cost due to overstay is evaluated as follows. Overstay duration is modelled as a Poisson process where the random variable is the overstay duration, $T_{overstay}$, and the average duration $\Lambda$ is penalized by the overstay pricey, e.g., $$\Lambda(y) := \hat{\Lambda}\frac{\hat{y}}{y}, \ y > 0, \quad (12)$$

where $\hat{\Lambda}$ is an expected overstay duration without the controller, i.e., baseline, and $\hat{y}$ is a baseline overstay price. That is, if the optimal overstay price determined by the controller is equal to the baseline overstay price, the average overstay duration is the same as the baseline overstay duration. If the optimal price is higher than the baseline price, the expected overstay duration decreases in inverse proportion. The same relation is applied when the optimal price is lower than the baseline price. The objective function J, Eqn. (3), can be further simplified by approximating the overstay cost $g_{flex}$ as the expected overstay duration, i.e., $$g_{flex} = \mathbb{E}(T_{overstay}) = \Lambda(y). \quad (13)$$

If the user selects charging-asap, the PEV is charged with a nominal power and the deterministic cost $f_{asap}$ is found by the multiplication of the parameters, i.e., $$f_{asap}(z) = \sum_{k=1}^{\hat{N}-1} (c_k - z^{asap})\Delta k, \quad (14)$$

where $$\hat{N} = \frac{(SOC_{need} - SOC_{init})B}{\Delta k \eta U_{nom}} \quad (15)$$

and $U_{nom}$ is the nominal power level which is fixed and known. The random overstay cost $g_{asap}$ can be formulated identically as (Eqn. (13)).

When a vehicle user refuses to charge and leaves, the system operation loses an opportunity to provide a charging service, and consequently loses revenue. This opportunity cost is quantified as the total cost of providing the uncontrolled charging without revenue:

$$f_\ell(0) = \sum_{k=1}^{\hat{N}-1} (c_k - 0)\Delta k. \quad (16)$$

The rationale for zero charging revenue is to quantify the opportunity cost as a fixed loss at each time step k, without penalizing the pricing policy z.

The probability of choosing a given alternative (Eqn. (2)) is not convex in z, and therefore the objective function (Eqn. (3)-(5)) is not convex. These equations are reformulated to yield a multi-convex problem, which is solved via Block Coordinate Descent (BCD).

The objective function in Eqn. (3)-(5) can be rewritten in the following compact form:

$$\min_{z \in \mathcal{Z}} sm(\Theta z)_{flex} \cdot \left(\min_{x \in \mathcal{X}} h_{flex}(z, x)\right) + sm(\Theta z)_{asap} \cdot h_{asap}(z) + sm(\Theta z)_\ell \cdot h_\ell(z) \quad (17)$$

$$= \min_{z \in \mathcal{Z}, x \in \mathcal{X}} sm(\Theta z)^T h(z, x), \quad (18)$$

where $sm(\bullet)$ is the softmax operator $$sm(\Theta z)_j = \frac{\exp\theta_j^T z}{\sum_{k \in \mathcal{A}} \exp\theta_k^T z}, \ \forall j \in \mathcal{A}, \quad (19)$$

$$h(z, x) = \begin{bmatrix} h_{flex}(z, x) \\ h_{asap}(z) \\ h_\ell(z) \end{bmatrix} = \begin{bmatrix} f_{flex}(x; z) + g_{flex}(z) \\ f_{asap}(z) + g_{asap}(z) \\ f_\ell(z) \end{bmatrix}, \quad (20)$$

$$z = [z_{flex} \ z_{asap} \ y \ 1]^T, \quad (21)$$

$$\Theta = [\theta_{flex} \ \theta_{asap} \ \theta_\ell]^T, \mathcal{A} = \{flex, asap, \ell\}, \quad (22)$$

$\mathcal{Z}$ is the domain of z, $\quad (23)$ $\mathcal{X}$ is the domain of x, satisfying Eq.(8)–(10) $\quad (24)$ To transform the non-convex problem, the following definition is applied. Definition IV.1 (Bi-convex function): Let $X \subseteq \mathbb{R}^n$, $Y \subseteq \mathbb{R}^m$ be two non-empty, convex sets. A function $h(x, y): X \times Y \to \mathbb{R}$ is called bi-convex function if $h_x(x, y)$ is convex in y for fixed $x \in X$ and $h_y(x, y)$ is convex in x for fixed $y \in Y$.

The objective function is neither convex nor bi-convex due to the softmax function (Eqn. (19)). However, it turns out that the problem structure can be exploited and reformulated as a multi-convex problem, which generalizes Definition IV.1. Indeed, the optimization problem can be rewritten as $$\min_{z \in \mathcal{Z}, x \in X} v^T h(z, x), \quad (25)$$

where $$v = sm(\Theta z),$$

which can be converted into a 3-block multi-convex problem. Next, we will handle the non-convex equality constraint $v = sm(\Theta z)$, which is reformulated as a bi-convex constraint in the next section.

In order to formulate the bi-convex representation of the constraints, the Log-Sum-Exponential function is denoted by $lse(u) = \ln(\Sigma_{j \in A} \exp(u_j))$. Given $u \in \mathbb{R}^n$:

$$lse(u) = \ln(1^T \exp(u)),$$

$$\nabla lse(u) = sm(u),$$

where $\exp(u) = [\exp(u_1) \ldots \exp(u_n)]$.

By definition the convex conjugate (i.e., Legendre-Fenchel transformation) of Log-Sum-Exponential is:

$$lse^*(v) \triangleq \max_u u^T v - lse(u) \quad (26)$$

The conjugate of Log-Sum-Exponential is the negative entropy, i.e., $$lse^*(v) = \begin{cases} v^T \ln(v) & \text{if } v \geq 0 \text{ and } 1^T v = 1 \\ \infty & \text{o.w.} \end{cases} \quad (27)$$

By defining $V \triangleq \{v \mid v \geq 0, 1^T v = 1\}$, as the set of finite discrete probability distributions. The Fenchel-Young inequality can be defined as:

$$lse(u) + lse^*(v) - u^T v \geq 0, \quad \forall u, \forall v \in V. \quad (28)$$

For all $v \in V$, the Fenchel-Young inequality is true with equality if and only if $$u = \operatorname{argmax}_u u^T v - lse(u), \quad (29)$$

since the Log-Sum-Exponential is strictly convex.

The first order optimality condition for Eqn. 28 yields $$v^* = \nabla lse(u) = sm(u). \quad (30)$$

Hence, $$lse(u) + lse^*(v) - u^T v \leq 0 \Leftrightarrow v = sm(u). \quad (31)$$

The equality of Eqn. 25 can be replaced with the inequality constraint of Eqn. 31. This is an equivalent reformulation, with no relaxation or approximation errors, as per the Fenchel-Young inequality.

Replacing u with $\Theta z$ in Eqn. 31:

$$v = sm(\Theta z) \Leftrightarrow lse(\Theta z) + lse^*(v) - v^T(\Theta z) \leq 0$$

This inequality can be relaxed given a precision parameter $\varepsilon$ by:

$$lse(\Theta z) + lse^*(v) - v^T(\Theta z) \leq \varepsilon$$

This inequality defines a bi-convex set in (z; v) with non-empty interior.

The original problem can be reformulated and relaxed to yield:

$$\min_{z \in \mathcal{Z}, x \in X, v \in V} v^T h(z, x) \quad (32)$$

$$\text{subject to } lse(\Theta z) + lse^*(v) - v^T(\Theta z) \leq \varepsilon$$

which is 3-block multiconvex in (z, x, v).

Next, the BCD algorithm is applied to solve the 3-block multi-convex problem in Eqn. 32. The details are illustrated in Algorithm 1. Each variable update requires the solution of a convex problem.

| Algorithm 1: Block Coordinate Descent Algorithm | | |
| --- | --- | --- |
| | Init | : $z^{(0)} = z_0$, $x^{(0)} = x_0$, $v^{(0)} = sm(\Theta z_0)$ |
| | | $F^{(0)} = v^{(0)T} h(z^{(0)}, x^{(0)})$ |
| 1 | while | $\|F^{(i+1)} - F^{(i)}\| > \varepsilon$ do |
| 2 | | $x^{(i+1)} = \operatorname{argmin}_{x \in X} h(z^{(i)}, x)^T v^{(i)}$ |
| 3 | | $z^{(i+1)} = \operatorname{argmin}_{z \in \mathcal{Z}} h(z, x^{(i+1)})^T v^{(i)}$ |
| 4 | | $+ \mu(lse(\Theta z) - z^T \Theta^T v^{(i)})$ |
| 5 | | $v^{(i+1)} = \operatorname{argmin}_{v \in V} v^T h(z^{(i+1)}, x^{(i+1)})$ |
| 6 | | $+ \mu(lse^*(v) - v^T \Theta z^{(i+1)})$ |
| 7 | end | |

The convergence analysis can be stated as follows. Theorem IV.1: Consider an s-block multi-convex function:

$$(x_1, \ldots, x_s) \in X \to f(x_1, \ldots, x_s)$$

That is, for the set given by $j \in \{1, \ldots 8\}$, the function $$x_j \to f(x_1, \ldots, x_{j-1}, x_j, x_{j+1}, \ldots, x_s)$$

defined on $$X_j := \{x_j \mid (x_1, \ldots, x_{j-1}, x_j, x_{j+1}, \ldots, x_s) \in X\}$$

is convex. If $f$ is differentiable with Lipschitz gradient, bounded below and locally strongly convex, the BCD will globally converge to a critical point of $f$ at a worst case rate $\mathcal{O}(\tau^k)$ with $0 < \tau < 1$ (i.e., a linear convergence rate).

As these hypotheses have been met in the present disclosure and the Log-Sum-Exponential function is locally strongly convex, the BCD algorithm must converge linearly.

The algorithms above were used to simulate the charging station pricing policy of FIG. 2.

For the simulation, measured data was sourced from the charging facilities at a workplace charging station. The data was measured from Jan. 16, 2019 to Jan. 23, 2019, including 201 charging events in the week. The charging station was equipped with level-2 chargers, for which the maximum charging power was 7.2 kW. The hours from 7 am to 10 pm were considered (i.e., a total of 15 hours) as the operation hours at the charging station.

Figure 3A:
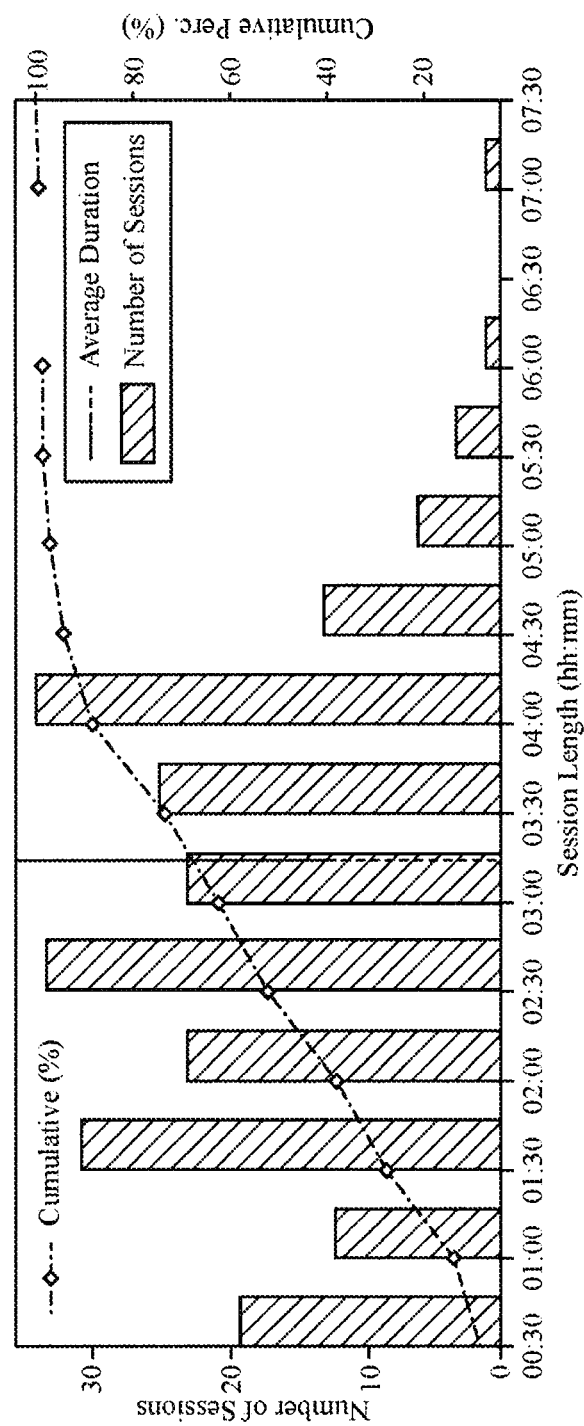
FIG. 3A is a histogram of total parking duration for all charging events, according to a described embodiment.
Figure 3B:
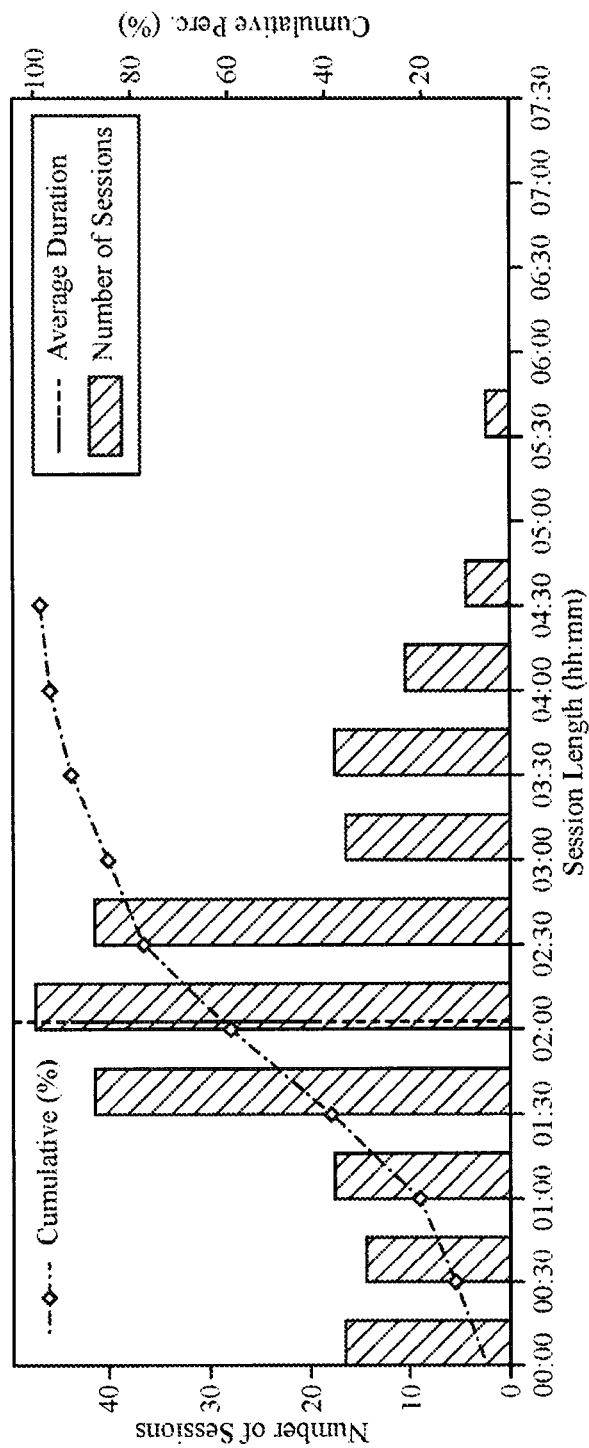
FIG. 3B is a histogram of charging duration for all the events, including vehicles which leave without choosing to charge, according to a described embodiment.

As shown in FIG. 3A, the average parking duration was 3.25 hours. As shown in FIG. 3B, the average charging duration was about 2 hours. The average charging duration to parking duration ratio was 0.62, meaning that, on average, 38% of the time that a vehicle was connected to a charger, the charger was not providing service due to overstay. This resulted in lower utilization of the charging infrastructure.

The Pacific Gas & Electric (PG&E) A-10, Medium General Time-of-Use (TOU) Service, was adopted as the time-of-use electricity tariff.

DCM parameters $\beta$, $\gamma$, and $\beta_0$ were synthetically generated so that:
i. charging-asap is preferred by default;
ii. a decreasing gap in charging price between charging-flexibility and charging-asap options increases the probability of controlled charging;
iii. high charging prices and overstay prices increase the probability of leaving without charging; and
iv. controlled charging is preferred with high desired parking duration.

Although these choices are intuitive, they have not been experimentally validated.

Simulations were run across 50 days (i.e., episodes) where, in each episode, a sequence of charging events was randomly sampled from the empirical probability density function (PDF) of charging demand. In each charging event, each user "randomly" chooses a charging option according to its perceived utility, which includes a charging price and an overstay price, computed by the pricing controller. The simulation results of controlled operations, i.e., with the price controller, were compared with the simulation results of nominal operations, i.e., without a price controller (the baseline). In particular, three performance metrics were considered: (i) overstay duration, (ii) net profit, and (iii) Quality-of-Service (QoS), which is calculated by the number of provided charging services.

A single instance of the temporal profile of the charging station is shown for total net power (FIG. 4A), profit (FIG. 4B), occupancy (FIG. 4C), cumulative overstay duration (FIG. 4D), and number of charging services provided (FIG. 4E), over the operating hours within a day. Each profile indicates aggregate values over all charging poles (set to a total of 6 in the simulation). FIGS. 4A-4E illustrate high charging demand in the morning, where the controller is more effective at managing load, and low charging demand in the evening, where the controller provides less benefit because there is less congestion to manage.

Figure 4A:
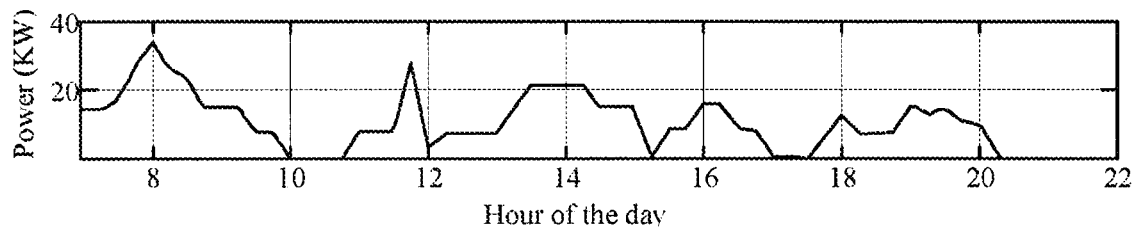
FIG. 4A is a graph illustrating simulated results for total net power over one day, according to a described embodiment.
Figure 4B:
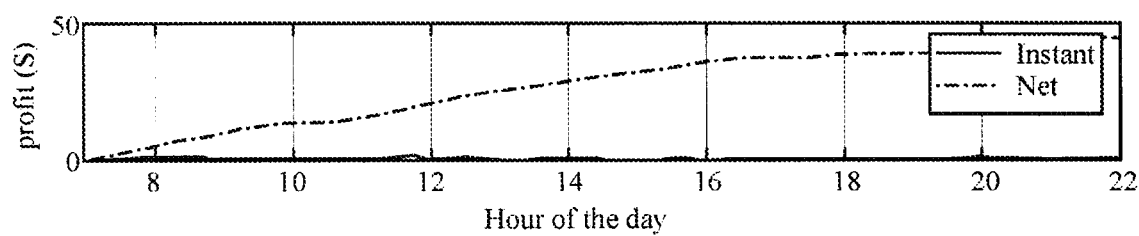
FIG. 4B is a graph illustrating simulated results for profit over one day, according to a described embodiment.
Figure 4C:
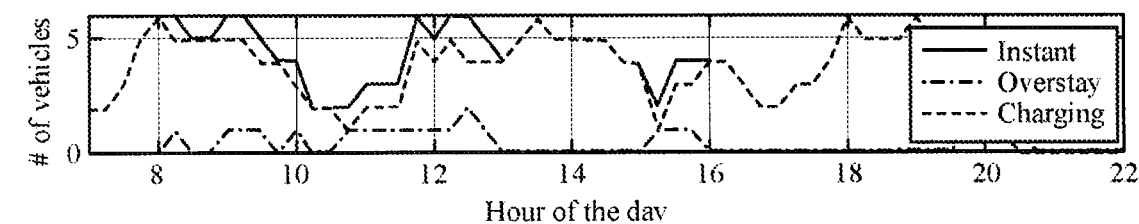
FIG. 4C is a graph illustrating simulated results for occupancy of the charging terminals over one day, according to a described embodiment.
Figure 4D:
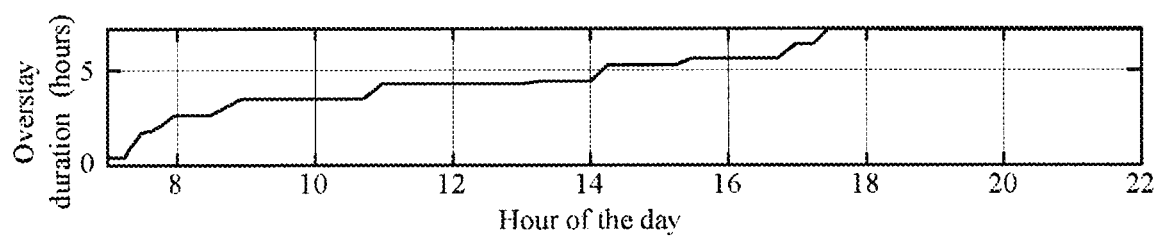
FIG. 4D is a graph illustrating simulated results for cumulative overstay duration over one day, according to a described embodiment.
Figure 4E:
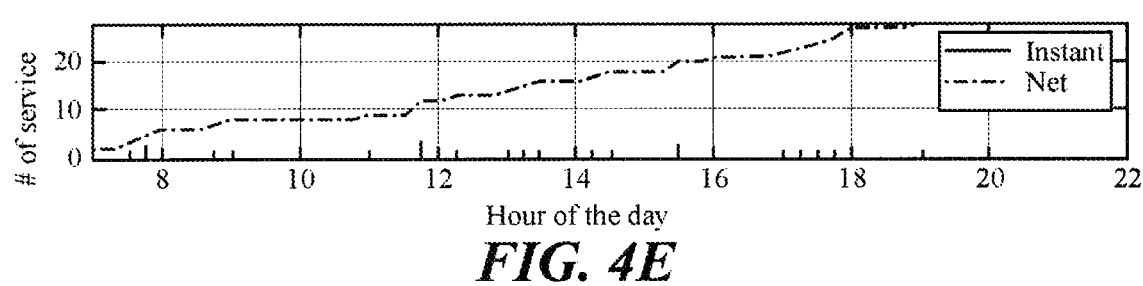
FIG. 4E is a graph illustrating simulated results for the number of charging services over one day, according to a described embodiment.
Figure 6:
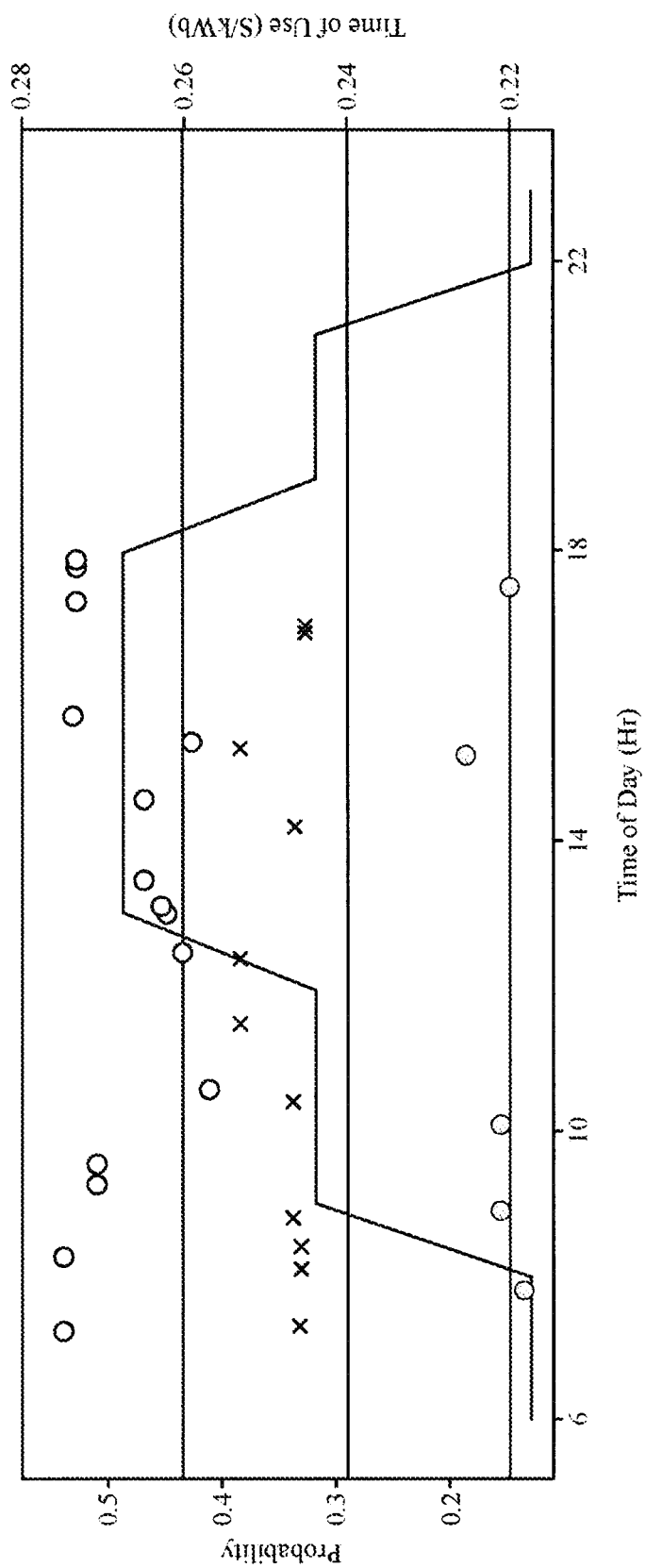
FIG. 6 is a graph illustrating the probability of charging choices and time of use with respect to time of day, according to a described embodiment.

In FIG. 4C, the overstay events primarily occur outside of the power peak hour period, i.e., 13:00-18:00, when the TOU prices are high as shown in FIG. 6. In this example, the overstaying vehicles are cleared out between 13:00-15:00, so that the charging station can accommodate more customers. This behavior occurs because the controller seeks flexible charging demand to reduce electricity consumed during PG&E's peak pricing period, when the utility's electricity cost is high. In FIG. 4E, a charging service initiates around 17:00, however, the actual charging occurred during the off-peak hours, 18:00-20:00 (FIG. 4A). The optimal charging controller managed electricity demand to minimize net costs and maximize net profit.

Figure 5A:
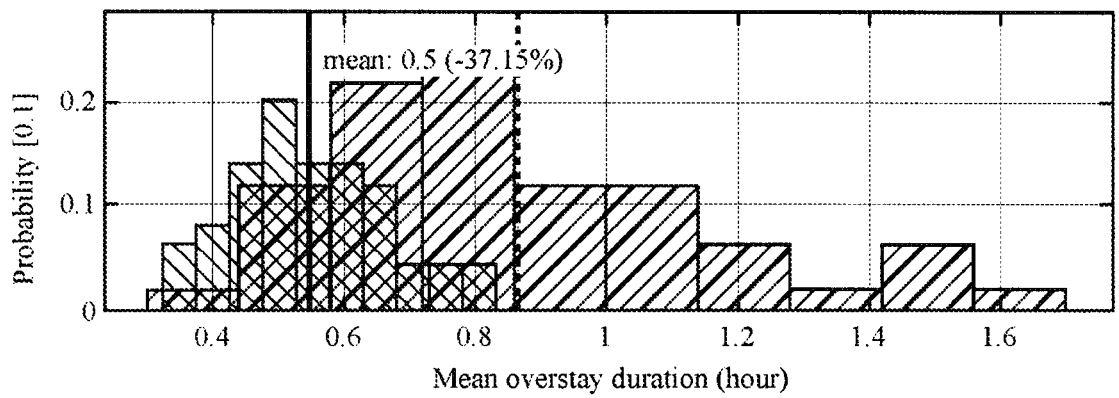
FIGS. 5A-5C are graphs illustrating the Monte Carlo simulation results for a total of 50 days of operation, according to a described embodiment, where
Figure 5B:
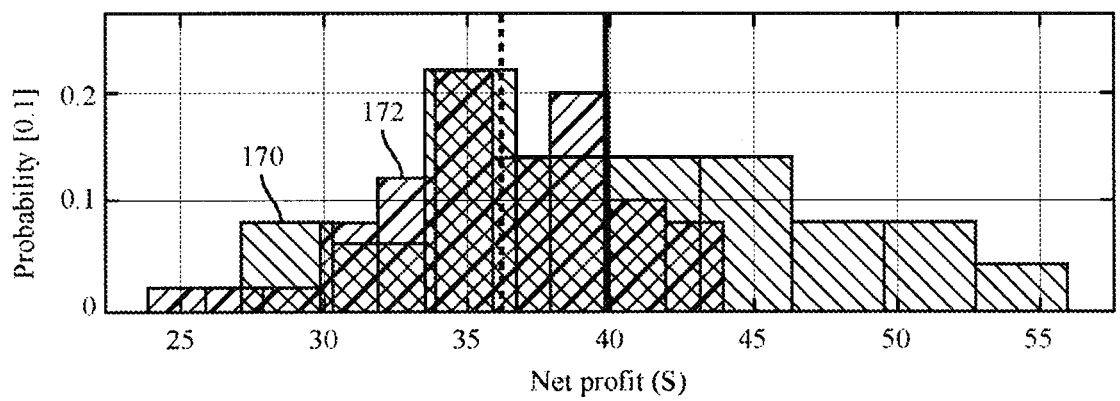
Figure 5C:
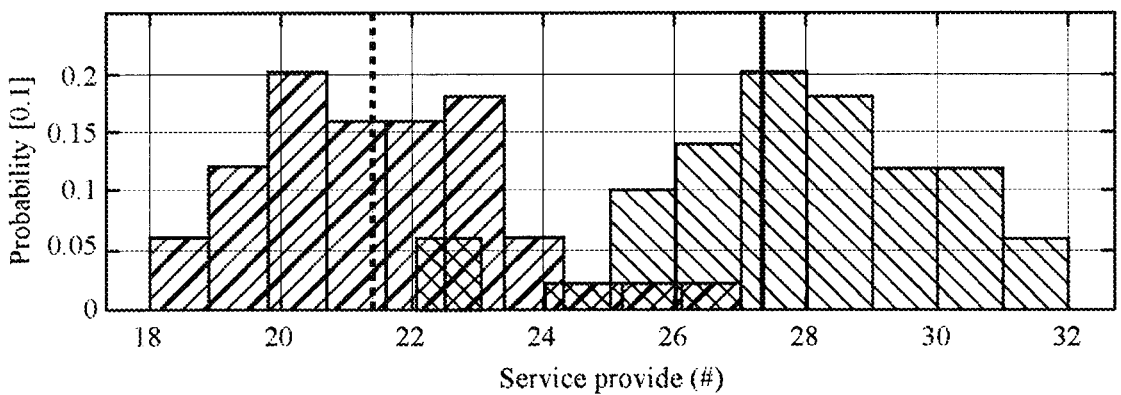

The effectiveness of the controller was further explored through Monte Carlo simulations. FIGS. 5A-5C illustrate, for a charging station with six charging terminals, that (a) the controller (see boxes 170 and mean shown by solid vertical line) decreases overstay duration by 37.15%, (b) increases net profit by 10.17%, and (c) increases the number of fulfilled charging services by 27.88% compared to the case without price control (boxes 172 and means shown by vertical dotted line). These improvements are essentially because the controller optimally sets the price for overstaying while mitigating the probability of losing a user. The overstay price encourages the users to leave sooner after their vehicle is fully charged, and therefore the station can provide more users with charging service. As a result, the net profit of the charging station increases. The boxes without the controller The simulations are based on a controller with perfect knowledge of the synthetically generated behavioral model, and the actual behavior will be different in practice. Therefore, instead of the numbers, the significant "potential" of the controller for PEV charging station operators is highlighted to increase utilization.

FIG. 6 shows the charging choices over time. Users in general have higher tendency to choose charging-asap, represented by the plain circles. However, during the utility's peak hours in the middle of the day, the controller adjusts the prices so that the preference for charging-asap decreases while the preference for charging-flexibility, represented by the Xs, increases. To clear out overstaying vehicles during peak hours, the overstay price is set high and correspondingly the probability of leaving without charging, represented by the dotted circles, increases. These results illustrate how a human behavioral model can be utilized to influence EV charging demand for the benefit of the charging facility.

Next, a sensitivity analysis was performed by varying the number of charging poles at the station and examining the results according to the three metrics defined above. The main streams of income are considered to be the charging service and overstay price. However, with the objective to minimize overstay duration, one stream of income can be negatively impacted.

Figure 7A:
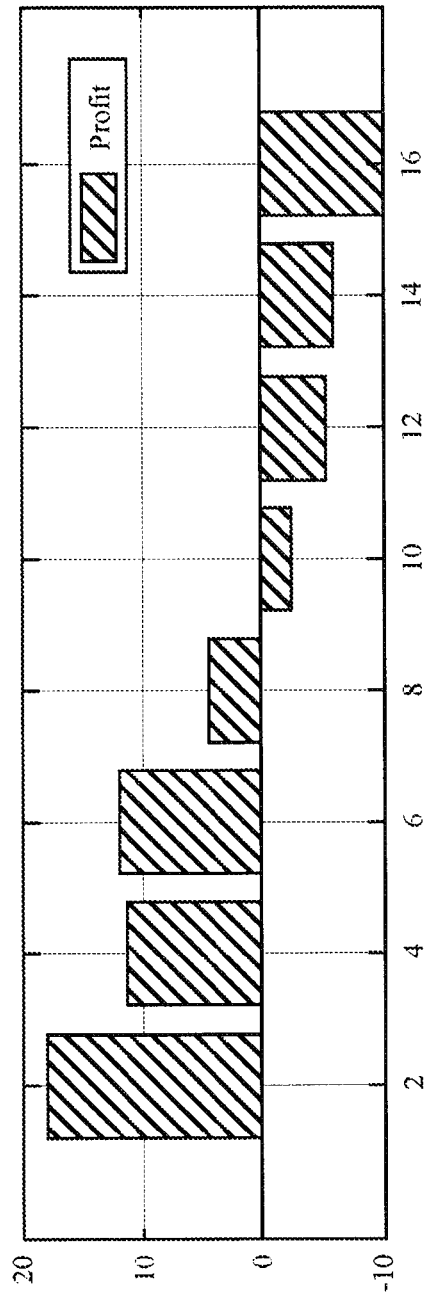
FIG. 7A illustrates the optimum baseline ratio (%) for changes in profit with respect to the number of charging terminals, according to a described embodiment.
Figure 7B:
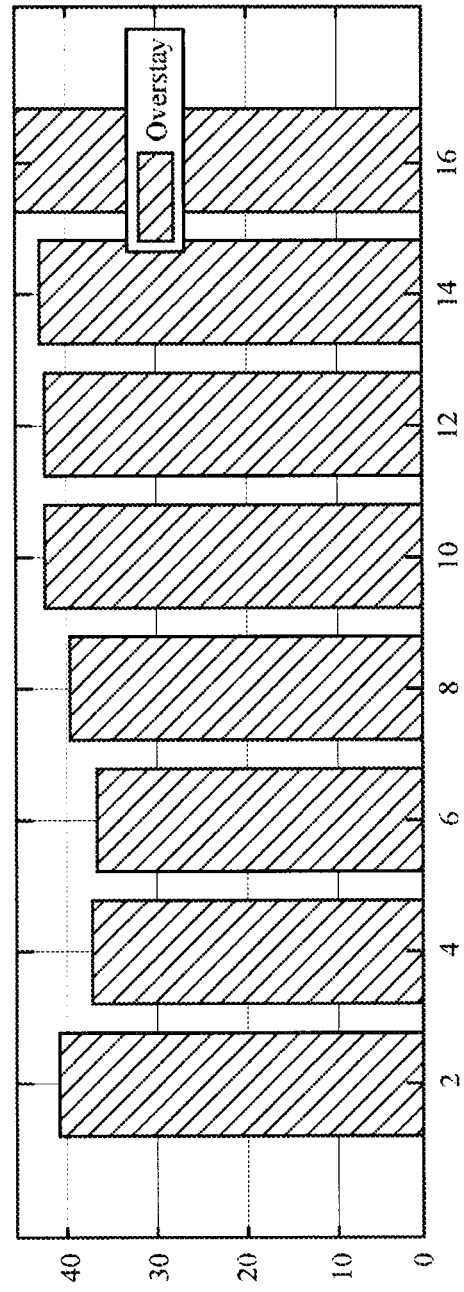
FIG. 7B illustrates the optimum baseline ratio (%) with respect to overstay compared to the baseline of charging with no control, according to a described embodiment.

As reflected in FIGS. 7A-7B, when the number of charging terminals is small (i.e., 2-6), the supply of charging infrastructure is much less than demand. In FIGS. 7A-7B, the controller increases net profit by providing more charging terminals by clearing out more overstaying vehicles. "Improvement" in the y-axis indicates the improvement in associated property (profit or overstay) compared to the baseline (without controller), which is computed as $$\left(\frac{\text{Controller Value}}{\text{Baseline Value}} - 1\right) * 100\%.$$

This is also verified by the Monte Carlo simulation results of FIGS. 5A-5C: there is nearly 30% improvement in QoS, which results in greater profit from providing more charging service. On the other hand, as the number of charging poles becomes large, the supply of charging infrastructure exceeds demand, and this affects the overall profit gain. In this case, although counter intuitive, a profit decrease is observed. This profit decrease is due to the reduction of overstay duration and corresponding reduction of the profit from overstay. Nevertheless, it is clear that EV charging price control yields the greatest benefits when demand exceeds supply.

The controller of the present disclosure optimizes a local problem, i.e., it optimizes the costs at an individual charger when charging service is sought. Nevertheless, the simulation studies demonstrate a significant improvement in the overall system-wide performance.

In the simulation, homogeneity among human users is assumed during the decision making process. That is, all uses have the same DCM parameters. However, each user might have different sensitivities to price information in practice. The evaluation of individual behavioral models is challenging, as it would involve significant efforts in tracking individual charging behaviors over a period of time to collect sufficient data to estimate the DCM parameters, as well as potential privacy issues.

Apart from user homogeneity, it has been assumed that there is no mismatch between the behavior model in the optimization problem and the actual behavior that generates choices in the simulations. The validity of this assumption depends on how accurately the DCM model represents the actual human behavior, which will also require empirical research with human subjects.

The present disclosure describes a mathematical control framework for charging station operation aimed at alleviating the overstay issue while maximizing net profit. In the framework, a DCM from behavioral economics is incorporated to quantify the probability of selection by a user, given a controllable price. The control problem is a nonconvex problem, yet it has a particular structure that enables reformulation into a multi-convex problem. It has been shown that BCD can effectively solve the multi-convex problem. The framework was validated with a real dataset for charging demand using an agent-based simulator. Monte-Carlo simulation results indicated a significant potential for improving three performance metrics: overstay duration, net profit, and number of fulfilled charging services. A sensitivity analysis demonstrated a loss of net profit when the availability of chargers exceeds demand, but an increase in net profit when demand exceeds charger availability.

Figure 8:
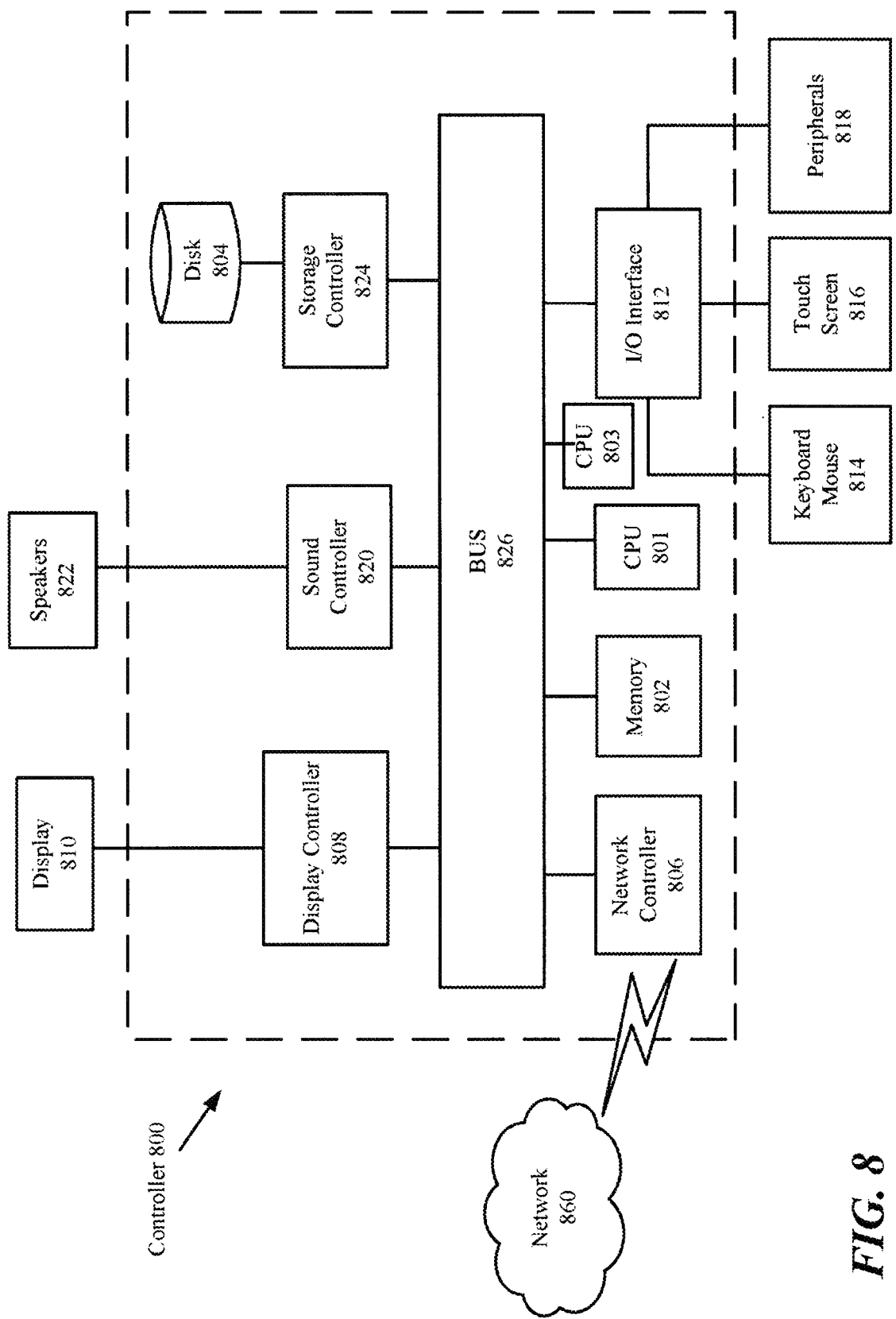
FIG. 8 is an illustration of a non-limiting example of details of computing hardware used in the computing system, according to a described embodiment.

Next, further details of the hardware description of the computing environment of FIG. 1A and FIG. 1B according to exemplary embodiments are described with reference to FIG. 8. In FIG. 8, a controller 800 is shown as representative of the charging system controller 150 and pricing policy processor 120 of FIG. 1A and FIG. 1B, in which the controller includes computing circuitry, including a CPU 801, which performs the processes of the pricing policy. The process data and instructions may be stored in memory 802. The instructions may include algorithms or calculations to apply the discrete choice model, block coordinate descent algorithm to the charging policy processor 120 to determine the charging options. These processes and instructions may also be stored on a storage medium disk 804 such as a hard drive (HDD) or portable storage medium, or may be stored remotely.

Further, the charging system controller 150 and pricing policy processor 120 and processes thereof in the present disclosure are not limited by the form of the computer-readable media on which the instructions of the inventive process are stored. For example, the instructions may be stored on CDs, DVDs, in FLASH memory, RAM, ROM, PROM, EPROM, EEPROM, hard drive, or any other information processing device with which the computing device communicates, such as a server or computer.

Further, the instructions may be provided as a utility application, background daemon, or component of an operating system, or combination thereof, executing in conjunction with CPU 801, 803 and an operating system such as, Microsoft Windows® UNIX®, Solaris®, LINUX®, Apple MAC-OS® and other systems known to those skilled in the art.

The hardware elements in order to achieve the charging system controller 150 and pricing policy processor 120 may be realized by various circuitry elements. For example, CPU 801 or CPU 803 may be a Xeon® or Core™ processor from Intel of America or an Opteron® processor from AMD of America, or may be other processor types that would be recognized by one of ordinary skill in the art. Alternatively, the CPU 801, 803 may be implemented on an FPGA, ASIC, PLD or using discrete logic circuits. Further, CPU 801, 803 may be implemented as multiple processors cooperatively working in parallel to perform the instructions of the inventive processes described above.

The computing device in FIG. 8 also includes a network controller 806, such as an Intel PRO® Ethernet™ network interface card from Intel Corporation of America, for interfacing with network 860. As can be appreciated, the network 860 can be a public network, such as the internet, or a private network such as an LAN or WAN network, or any combination thereof and can also include PSTN or ISDN sub-networks. The network 860 can also be wired, such as an Ethernet™ network, or can be wireless such as a cellular network including EDGE®, 3G, 4G® and 5G™ wireless cellular systems. The wireless network can also be WIFI®, BLUETOOTH®, RF, or any other wireless form of communication that is known.

The computing device further includes a display controller 808, such as a NVIDIA® GeForce® GTX or Quadro™ graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. The general purpose I/O interface also connects to a variety of peripherals 818 including printers and scanners.

A sound controller 820 is also provided in the computing device, such as Sound Blaster X-Fi® Titanium from Creative, to interface with speakers/microphone 822. The microphone and speakers may be part of the user interface 104, wherein signals are sent along communication paths 152 from the charging system controller 150 to the charging terminal 104.

The general purpose storage controller 824 connects the storage medium disk 804 with communication bus 826, which may be a PCI®, PCIe® bus or the like for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements.

The functions and features described herein may also be executed by various distributed components of a system. For example, one or more processors may execute these system functions of the present disclosure, wherein the processors are distributed across multiple components communicating in a network. The distributed components may include one or more client and server machines, which may share processing, in addition to various human interface and communication devices (e.g., display monitors, smart phones, tablets, or the like).

The network may be a private network, such as a local area network or wide area network, or may be a public network, such as the internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

Embodiments of the present disclosure are as set forth in the following parentheticals.

(1) A system for determining a pricing policy for charging electric vehicles, the pricing policy including overstay, comprising a charging terminal configured for delivering a charging power to a battery of an electric vehicle; and a computing device comprising a charging system controller and a pricing policy processor, the charging system controller being configured to receive user inputs from a user computing device, the user inputs including an expected parking duration and a desired added range, send the user inputs to the pricing policy processor; and the pricing policy processor being configured to receive the user inputs from the charging system controller, generate pricing options based on the expected parking duration, the desired added range and at least one parameter among the following parameters: a time of day, a current energy cost, a future energy cost and a probability of the user choosing a pricing option or choosing to reject all pricing options and leaving, optimize the pricing options for maximum net profit and/or maximum electric vehicle throughput of the at least one charging terminal; transmit the pricing options to the user computing device, wherein the pricing options include a price for charging-asap, a price for charging-flexibility and a price for overstay; receive a user pricing choice and generate and transmit an optimized charging schedule to the charging terminal to control the charging power over the expected duration.

(2) The system of (1), wherein the user computing device is configured to access a website to receive the pricing options, the website providing an interface for the user inputs and for receiving the pricing options.

(3) The system of any one of (1) to (2), wherein the user computing device is configured to download a mobile web application onto the user computing device, the mobile web application providing an interface for entering the user inputs, receiving the pricing options and entering the pricing choices.

(4) The system of any one of (1) to (3), wherein the desired added range is one of a number of miles and a number of kilometers.

(5) The system of any one of (1) to (4), wherein the pricing policy processor is further configured to optimize a net profit of the charging terminal by: applying a discrete choice model to each pricing option; and computing a set of probabilities of a user choosing each of the pricing options.

(6) The system of any one of (1) to (5), wherein the pricing policy processor is further configured to compute a set of probabilities by minimizing a convex combination of a net charging expense for purchasing energy from an electrical utility and a net cost resulting from overstay.

The system any one of (1) to (6), wherein the pricing policy processor is further configured to: minimize the convex combination by applying three control variables including a charging tariff for charging-flexibility, $z^{flex}$, a charging tariff for charging-asap, $z^{asap}$, an overstay price, y; and formulate a non-convex objective function, J, of an expected cost over the parking duration based on $J=\text{Pr}(\text{charging-flex})(f_{flex}(z)+\lambda_g g_{flex}(z))+\text{Pr}(\text{charging-asap})(f_{asap}(z)+\lambda_g g_{flex}(z))+\text{Pr}(\text{leave})(f_l(z))$, where Pr indicates a probability of choosing a charging option, $f$ indicates a deterministic cost, g indicates a random cost, and $\lambda_g$ is a regularization parameter.

(8) The system of any one of (1) to (7), wherein the pricing processor is further configured to: reformulate the non-convex objective function, J, as a three-block multi-convex problem; and apply a block coordinate descent algorithm to solve the three-block multi-convex problem.

(9) A method for determining a pricing policy for charging electric vehicles, the pricing policy including overstay, comprising: receiving, at a charging system controller, user inputs including an expected parking duration and a desired added range; sending the user inputs to a pricing policy processor; receiving, by the pricing policy processor, the user inputs; generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving; optimizing the pricing options for maximum net profit and/or maximum electric vehicle throughput of the charging terminal; transmitting the pricing options to a user, wherein the pricing options include a price for charging-asap, a price for charging-flexibility, and a price for overstay; and receiving a user pricing choice and generating and transmitting an optimized charging schedule to the charging terminal to control the charging power over the expected duration.

(10) The method of (9), further comprising: wherein the desired added range is one of a number of miles and a number of kilometers.

(11) The method of any one of (9) to (10), further comprising: providing a website accessible by the user for entering the user inputs, receiving the pricing options and entering the pricing choices, or providing a downloadable mobile web application to the user for entering the user inputs, receiving the pricing options and entering the pricing choices.

(12) The method any one of (9) to (11), further comprising: applying a discrete choice model to each pricing option; and computing a set of probabilities of the user choosing each of the pricing options.

(13) The method of any one of (9) to (12), further comprising: computing a set of probabilities by minimizing a convex combination of a net charging expense for purchasing energy from an electrical utility and a net cost resulting from overstay.

(14) The method of any one of (9) to 13), further comprising: minimizing the convex combination by applying three control variables including a charging tariff for charging-flexibility, $z^{flex}$, a charging tariff for charging-asap, $z^{asap}$, and an overstay price, y; and formulating a non-convex objective function, J, of an expected cost over the parking duration based on $J=\text{Pr}(\text{charging-flex})(f_{flex}(z)+\lambda_g g_{flex}(z))+\text{Pr}(\text{charging-asap})(f_{asap}(z)+$ $\lambda_g g_{flex}(z))+\Pr(\text{leave})(f_l(z))$, where Pr indicates a probability of choosing a charging option, $f$ indicates a deterministic cost, $g$ indicates a random cost, and $\lambda_g$ is a regularization parameter.

(15) The method of any one of (9) to 14, further comprising: reformulating the non-convex objective function, J, as a three-block multi-convex problem; and applying a block coordinate descent algorithm to solve the three-block multi-convex problem.

(16) A non-transitory computer readable medium having instructions stored therein that, when executed by one or more processors, cause the one or more processors to perform a method for determining a pricing policy for charging electric vehicles, the pricing policy including overstay, comprising: receiving, at a charging system controller, user inputs including an expected parking duration and a desired added range; sending the user inputs to a pricing policy processor; receiving, by the pricing policy processor, the user inputs; generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving; optimizing the pricing options for maximum net profit and/or maximum electric vehicle throughput of the charging terminal; transmitting the pricing options to a user, wherein the pricing options include a price for charging-asap, a price for charging-flexibility, and a price for overstay; and receiving a user pricing choice and generating and transmitting an optimized charging schedule to the charging terminal to control the charging power over the expected duration.

(17) The non-transitory computer readable medium of (16), wherein the method further comprises: applying a discrete choice model to each pricing option; and computing a set of probabilities of the user choosing each of the pricing options.

(18) The non-transitory computer readable medium of any one of (16) to (17), wherein the method further comprises: computing a set of probabilities by minimizing a convex combination of a net charging expense for purchasing energy from an electrical utility and a net cost resulting from overstay.

(19) The non-transitory computer readable medium of any one of (16) to (18), wherein the method further comprises: minimizing the convex combination by applying three control variables including a charging tariff for charging-flexibility, $z^{flex}$, a charging tariff for charging-asap, $z^{asap}$, and an overstay price, y; and formulating a non-convex objective function, J, of an expected cost over the parking duration based on $J=\Pr(\text{charging-flex})$ $(f_{flex}(z)+\lambda_g g_{flex}(z))+\Pr(\text{charging-asap})(f_{asap}(z)+\lambda_g g_{flex}z))+\Pr(\text{leave})(f_l(z))$, where Pr indicates a probability of choosing a charging option, $f$ indicates a deterministic cost, $g$ indicates a random cost, and $\lambda_g$ is a regularization parameter.

(20) The non-transitory computer readable medium of any one of (16) to (19), wherein the method further comprises: reformulating the non-convex objective function, J, as a three-block multi-convex problem; and applying a block coordinate descent algorithm to solve the three-block multi-convex problem.

The invention claimed is:

1. A system for determining a pricing policy for charging electric vehicles, the pricing policy including overstay, comprising:
   a charging terminal configured for delivering a charging power to a battery of an electric vehicle; and
   a computing device comprising a charging system controller and a pricing policy processor,
   the charging system controller being configured to
      receive user inputs from a user computing device, the user inputs including an expected parking duration and a desired added range;
      send the user inputs to the pricing policy processor; and
   the pricing policy processor being configured to
      receive the user input from the charging system controller,
      generate pricing options based on the expected parking duration, the desired added range, and at least one parameter among the following parameters: a time of day, a current energy cost, a future energy cost, and a probability of the user choosing a pricing option or choosing to reject all pricing options and leaving;
      optimize the pricing options for maximum net profit and/or maximum electric vehicle throughput of the charging terminal,
      transmit the pricing options to the user computing device, wherein the pricing options include a price for charging-asap, a price for charging-flexibility, and a price for overstay, and
      receive a user pricing choice and generate and transmit an optimized charging schedule to the charging terminal to control the charging power over the expected duration.

2. The system of claim 1, wherein the user computing device is configured to access a website to receive the pricing options, the website providing an interface for the user inputs and for receiving the pricing options.

3. The system of claim 1, wherein the user computing device is configured to download a mobile web application onto the user computing device, the mobile web application providing an interface for entering the user inputs, receiving the pricing options and entering the pricing choices.

4. The system of claim 1, wherein the desired added range is one of a number of miles and a number of kilometers.

5. The system of claim 1, wherein the pricing policy processor is further configured to optimize a net profit of the charging terminal by:
   applying a discrete choice model to each pricing option; and
   computing a set of probabilities of a user choosing each of the pricing options.

6. The system of claim 5, wherein the pricing policy processor is further configured to compute a set of probabilities by minimizing a convex combination of a net charging expense for purchasing energy from an electrical utility and a net cost resulting from overstay.

7. The system of claim 6, wherein the pricing policy processor is further configured to:
   minimize the convex combination by applying three control variables including a charging tariff for charging-flexibility, $z^{flex}$, a charging tariff for charging-asap, $z^{asap}$, and an overstay price, y; and
   formulate a non-convex objective function, J, of an expected cost over the parking duration based on $J=\Pr(\text{charging-flex})(f_{flex}(z)+\lambda_g g_{flex}(z))+\Pr(\text{charging-asap})(f_{asap}(z)+\lambda_g g_{flex}(z))+\Pr(\text{leave})(f_l(z))$, where Pr indicates a probability of choosing a charging option, $f$ indicates a deterministic cost, g indicates a random cost, and $\lambda_g$ is a regularization parameter.

8. The system of claim 7, wherein the pricing processor is further configured to:
reformulate the non-convex objective function, J, as a three-block multi-convex problem; and
apply a block coordinate descent algorithm to solve the three-block multi-convex problem.

9. A method for determining a pricing policy for charging electric vehicles, the pricing policy including overstay, comprising:
receiving, at a charging system controller, user inputs including an expected parking duration and a desired added range;
sending the user inputs to a pricing policy processor;
receiving, by the pricing policy processor, the user inputs;
generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving;
optimizing the pricing options for maximum net profit and/or maximum electric vehicle throughput of the charging terminal;
transmitting the pricing options to a user, wherein the pricing options include a price for charging-asap, a price for charging-flexibility, and a price for overstay; and
receiving a user pricing choice and generating and transmitting an optimized charging schedule to the charging terminal to control the charging power over the expected duration.

10. The method of claim 9, wherein the desired added range is one of a number of miles and a number of kilometers.

11. The method of claim 9, further comprising:
providing a website accessible by the user for entering the user inputs, receiving the pricing options and entering the pricing choices, or
providing a downloadable mobile web application to the user for entering the user inputs, receiving the pricing options and entering the pricing choices.

12. The method of claim 9, further comprising:
applying a discrete choice model to each pricing option; and
computing a set of probabilities of the user choosing each of the pricing options.

13. The method of claim 12, further comprising:
computing a set of probabilities by minimizing a convex combination of a net charging expense for purchasing energy from an electrical utility and a net cost resulting from overstay.

14. The method of claim 13, further comprising:
minimizing the convex combination by applying three control variables including a charging tariff for charging-flexibility, $z^{flex}$, a charging tariff for charging-asap, $z^{asap}$, and an overstay price, y; and
formulating a non-convex objective function, J, of an expected cost over the parking duration based on J=Pr(charging-flex)($f_{flex}(z)+\lambda_g g_{flex}(z)$)+Pr(charging-asap)($f_{asap}(z)+\lambda_g g_{flex}(z)$)+Pr(leave)($f_l(z)$), where Pr indicates a probability of choosing a charging option, $f$ indicates a deterministic cost, g indicates a random cost, and $\lambda_g$ is a regularization parameter.

15. The method of claim 13, further comprising:
reformulating the non-convex objective function, J, as a three-block multi-convex problem; and
applying a block coordinate descent algorithm to solve the three-block multi-convex problem.

16. A non-transitory computer readable medium having instructions stored therein that, when executed by one or more processors, cause the one or more processors to perform a method for determining a pricing policy for charging electric vehicles, the pricing policy including overstay, comprising:
receiving, at a charging system controller, user inputs including an expected parking duration and a desired added range;
sending the user inputs to a pricing policy processor;
receiving, by the pricing policy processor, the user inputs;
generating, by the pricing policy processor, pricing options based on the expected parking duration, and at least one parameter among the following parameters: a time of day, a current energy cost, a future energy cost, and a probability of the user choosing a pricing option or choosing to reject all pricing options and of the user leaving;
optimizing the pricing options for maximum net profit and/or maximum electric vehicle throughput of the charging terminal;
transmitting the pricing options to a user, wherein the pricing options include a price for charging-asap, a price for charging-flexibility, and a price for overstay; and
receiving a user pricing choice and generating and transmitting an optimized charging schedule to the charging terminal to control the charging power over the expected duration.

17. The non-transitory computer readable medium of claim 16, wherein the method further comprises:
applying a discrete choice model to each pricing option; and
computing a set of probabilities of the user choosing each of the pricing options.

18. The non-transitory computer readable medium of claim 17, wherein the method further comprises:
computing a set of probabilities by minimizing a convex combination of a net charging expense for purchasing energy from an electrical utility and a net cost resulting from overstay.

19. The non-transitory computer readable medium of claim 18, wherein the method further comprises:
minimizing the convex combination by applying three control variables including a charging tariff for charging-flexibility, $z^{flex}$, a charging tariff for charging-asap, $z^{asap}$, and an overstay price, y; and
formulating a non-convex objective function, J, of an expected cost over the parking duration based on J=Pr(charging-flex)($f_{flex}(z)+\lambda_g g_{flex}(z)$)+Pr(charging-asap)($f_{asap}(z)+\lambda_g g_{flex}(z)$)+Pr(leave)($f_l(z)$), where Pr indicates a probability of choosing a charging option, $f$ indicates a deterministic cost, g indicates a random cost, and $\lambda_g$ is a regularization parameter.

20. The non-transitory computer readable medium of claim 19, wherein the method further comprises:
reformulating the non-convex objective function, J, as a three-block multi-convex problem; and
applying a block coordinate descent algorithm to solve the three-block multi-convex problem.

* * * * *